April 27, 1965 R. J. HEPPE ET AL 3,180,205
DISTANCE MEASURING APPARATUS HAVING A DIGITAL OUTPUT CIRCUIT
Filed June 9, 1960 12 Sheets-Sheet 1

INVENTORS.
ROBERT J. HEPPE
RAYMOND L. PICKHOLTZ
BY
ATTORNEY

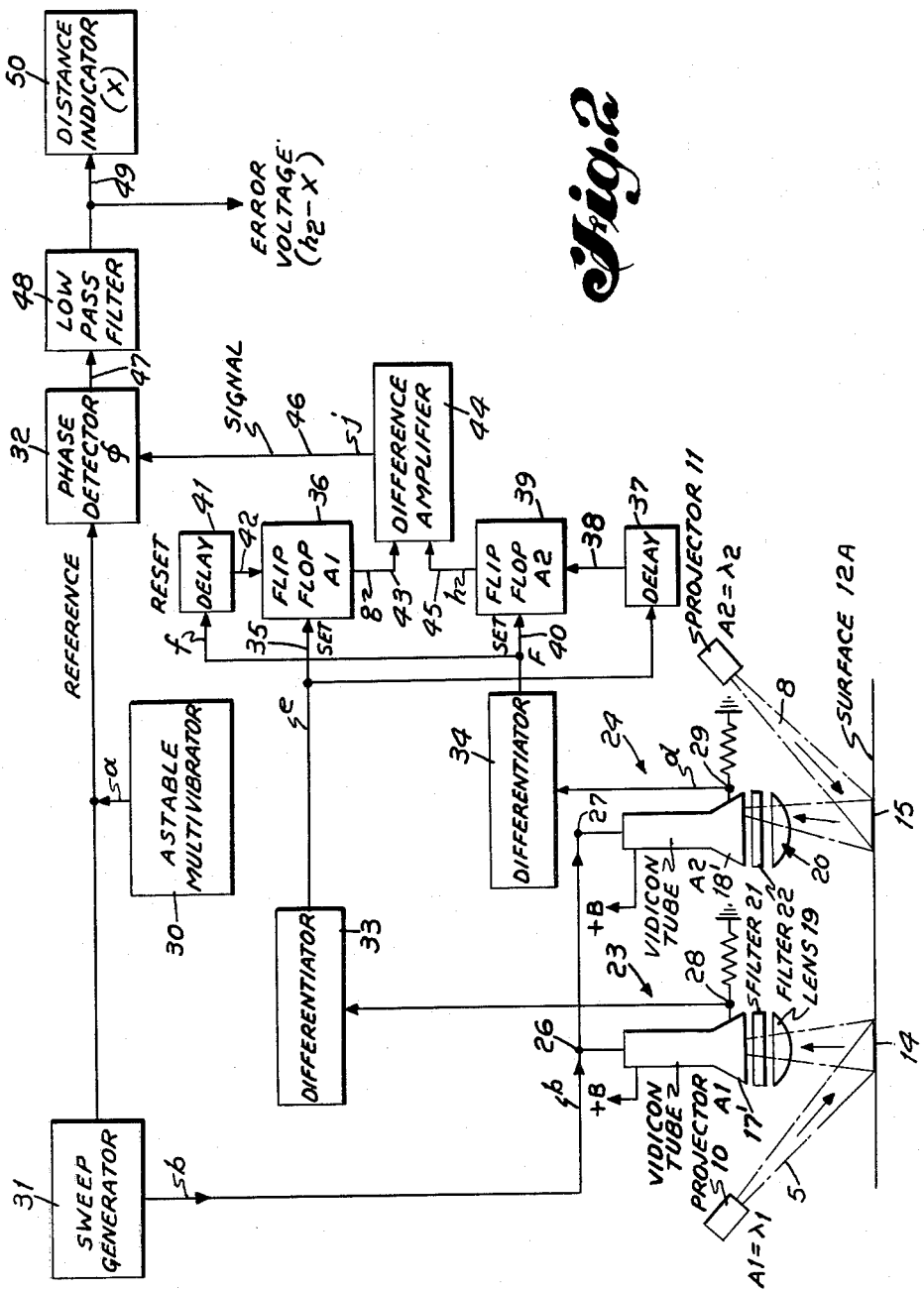

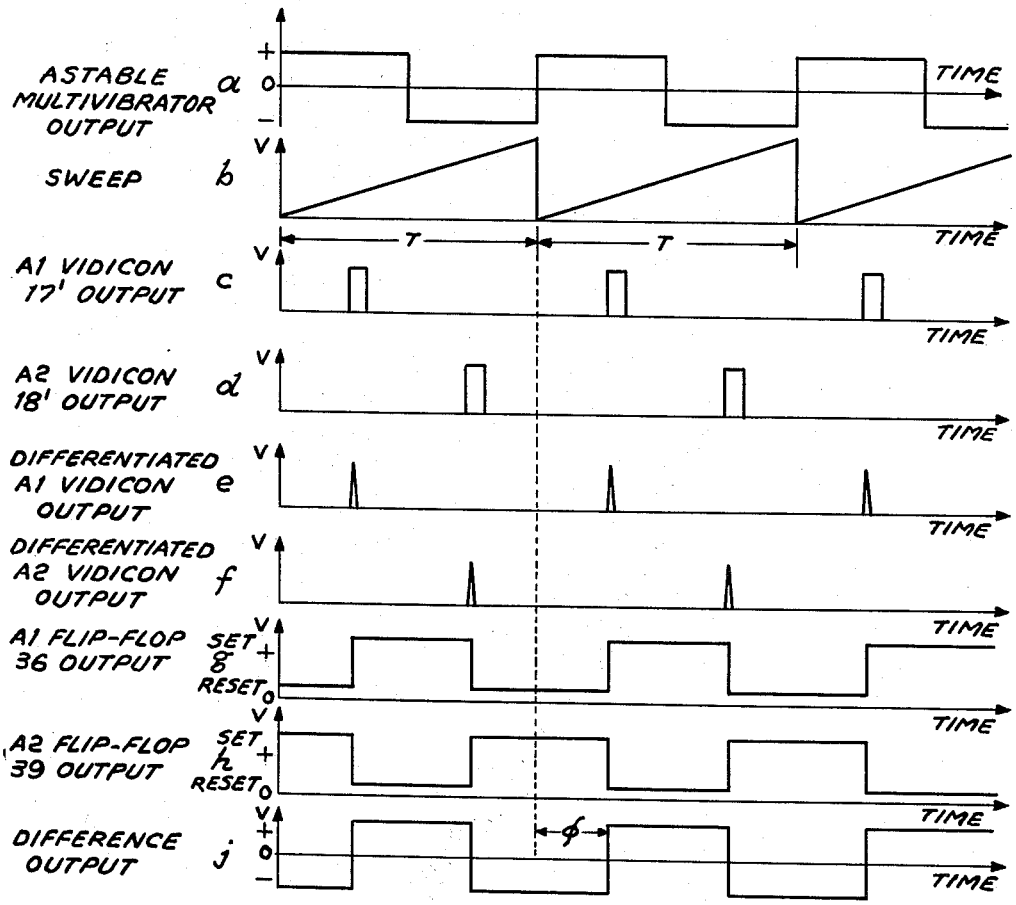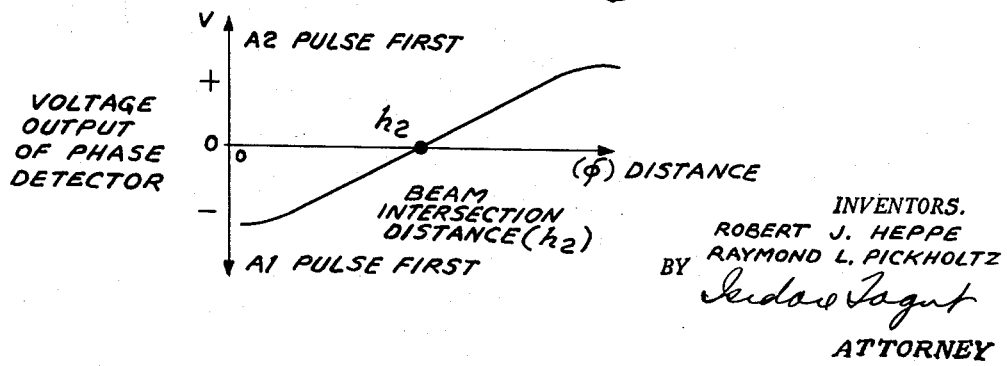

April 27, 1965 R. J. HEPPE ET AL 3,180,205
DISTANCE MEASURING APPARATUS HAVING A DIGITAL OUTPUT CIRCUIT
Filed June 9, 1960 12 Sheets-Sheet 4
*Fig. 6A*
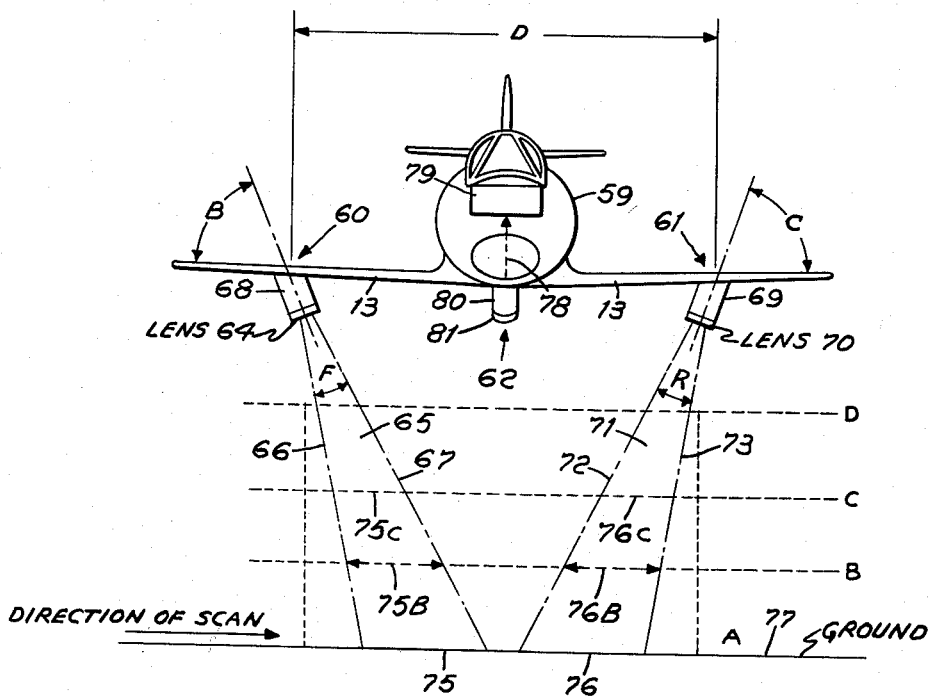
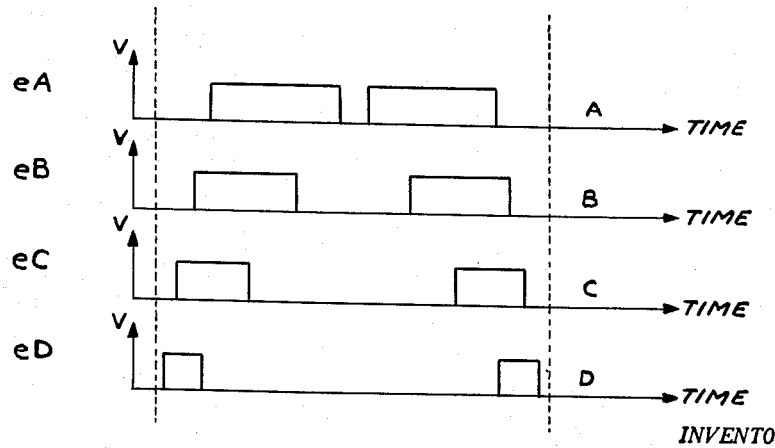
*Fig. 6B*
INVENTORS.
ROBERT J. HEPPE
RAYMOND L. PICKHOLTZ
BY
ATTORNEY April 27, 1965   R. J. HEPPE ET AL   3,180,205
DISTANCE MEASURING APPARATUS HAVING A DIGITAL OUTPUT CIRCUIT
Filed June 9, 1960   12 Sheets-Sheet 5
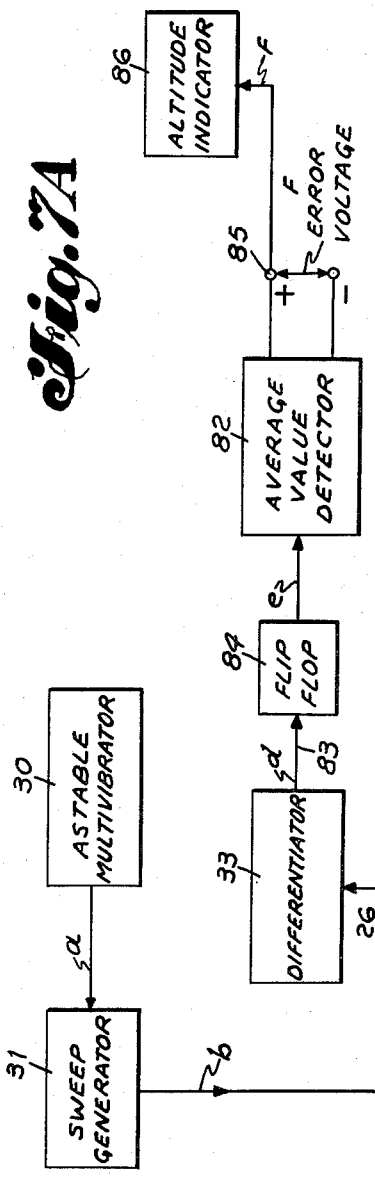
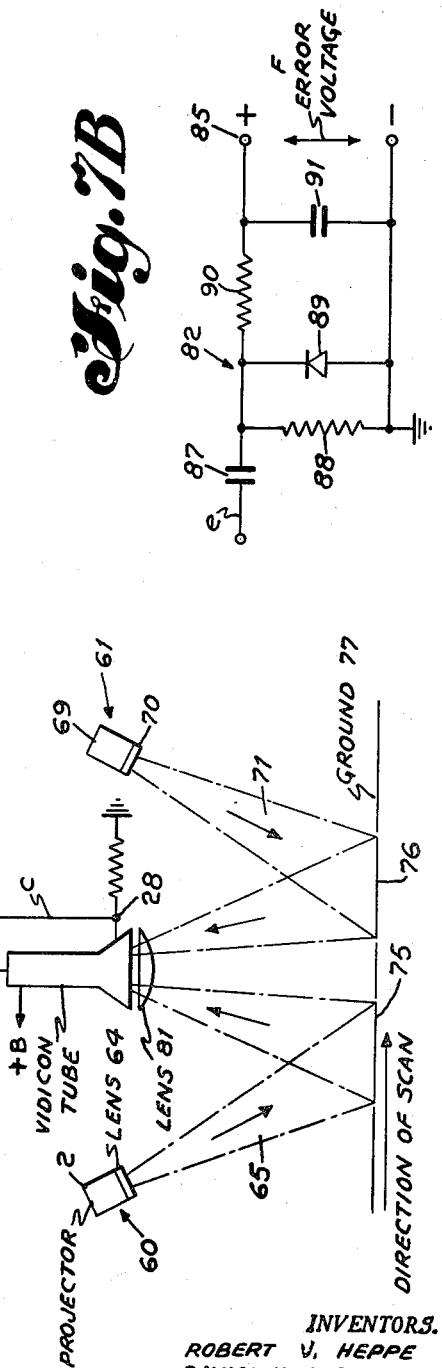
INVENTORS.
ROBERT V. HEPPE
RAYMOND L. PICKHOLTZ
BY
ATTORNEY April 27, 1965        R. J. HEPPE ET AL        3,180,205
DISTANCE MEASURING APPARATUS HAVING A DIGITAL OUTPUT CIRCUIT
Filed June 9, 1960        12 Sheets-Sheet 7

$$6.\ h = \frac{H}{1 + \frac{H}{D \tan C}}$$

INVENTORS.
ROBERT J. HEPPE
BY RAYMOND L. PICKHOLTZ

*Isidore Togut*

ATTORNEY

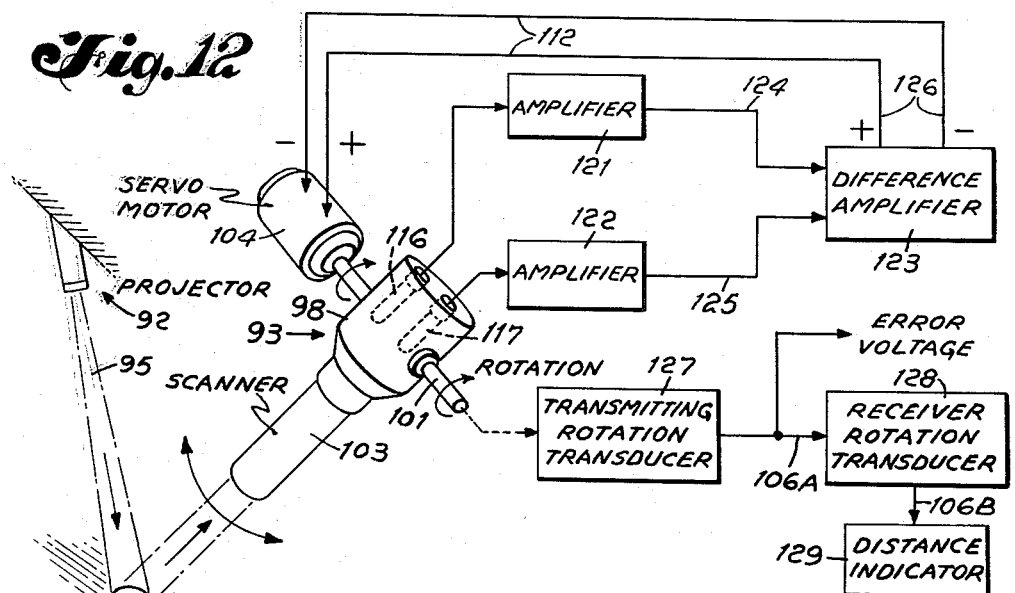
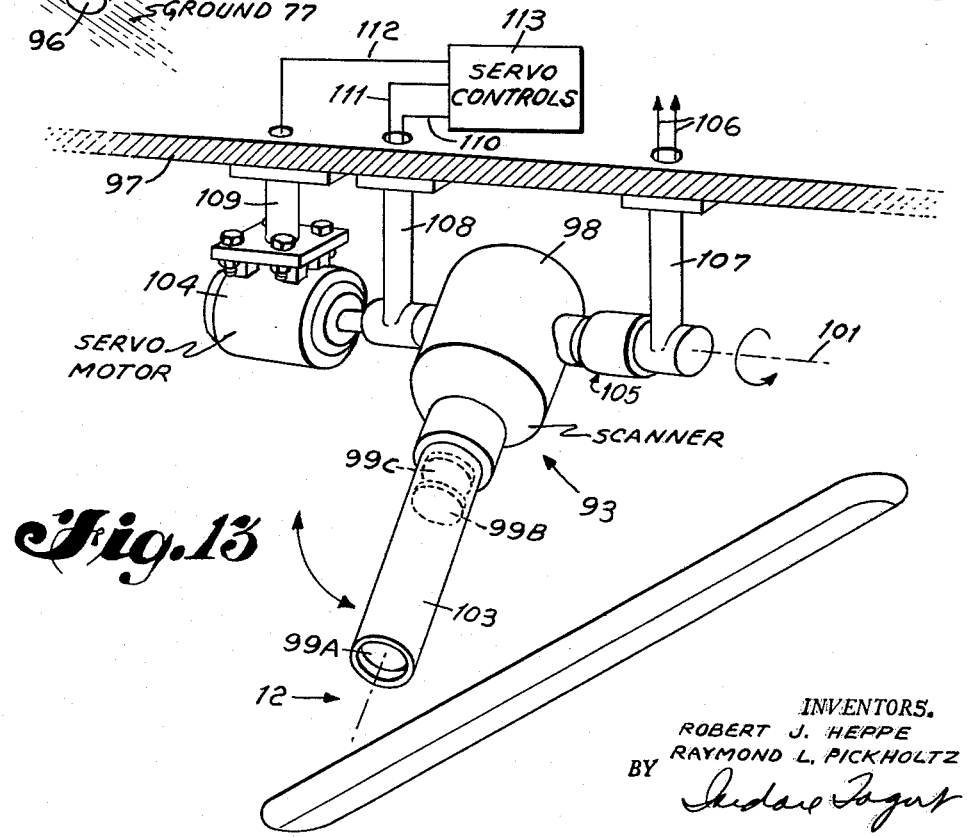

April 27, 1965  R. J. HEPPE ET AL  3,180,205
DISTANCE MEASURING APPARATUS HAVING A DIGITAL OUTPUT CIRCUIT
Filed June 9, 1960  12 Sheets-Sheet 9

INVENTORS.
ROBERT J. HEPPE
RAYMOND L. PICKHOLTZ
BY
ATTORNEY

April 27, 1965 R. J. HEPPE ET AL 3,180,205
DISTANCE MEASURING APPARATUS HAVING A DIGITAL OUTPUT CIRCUIT
Filed June 9, 1960 12 Sheets-Sheet 11
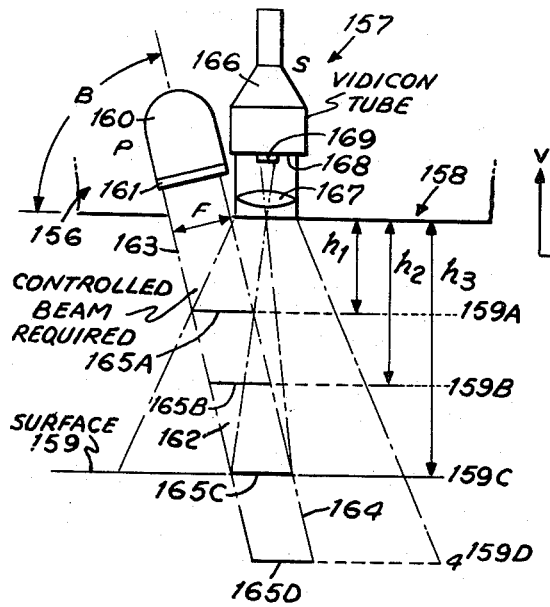
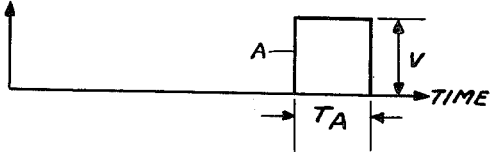
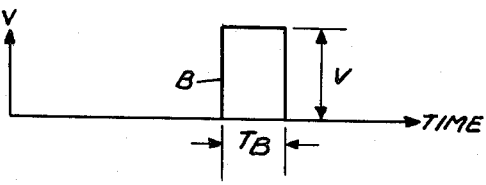
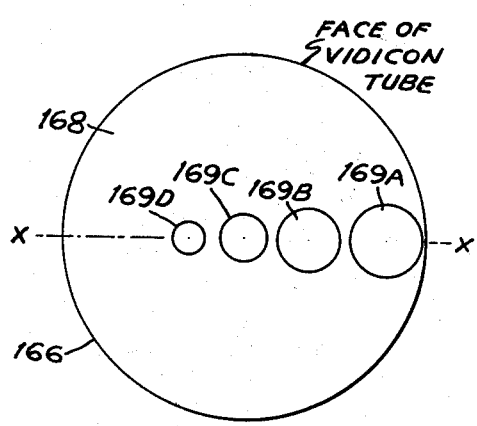
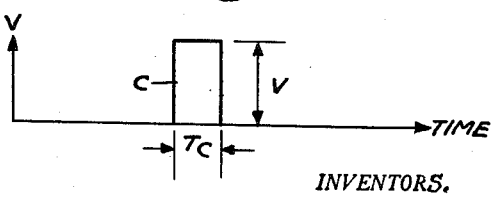
INVENTORS.
ROBERT J. HEPPE
RAYMOND L. PICKHOLTZ
BY
ATTORNEY

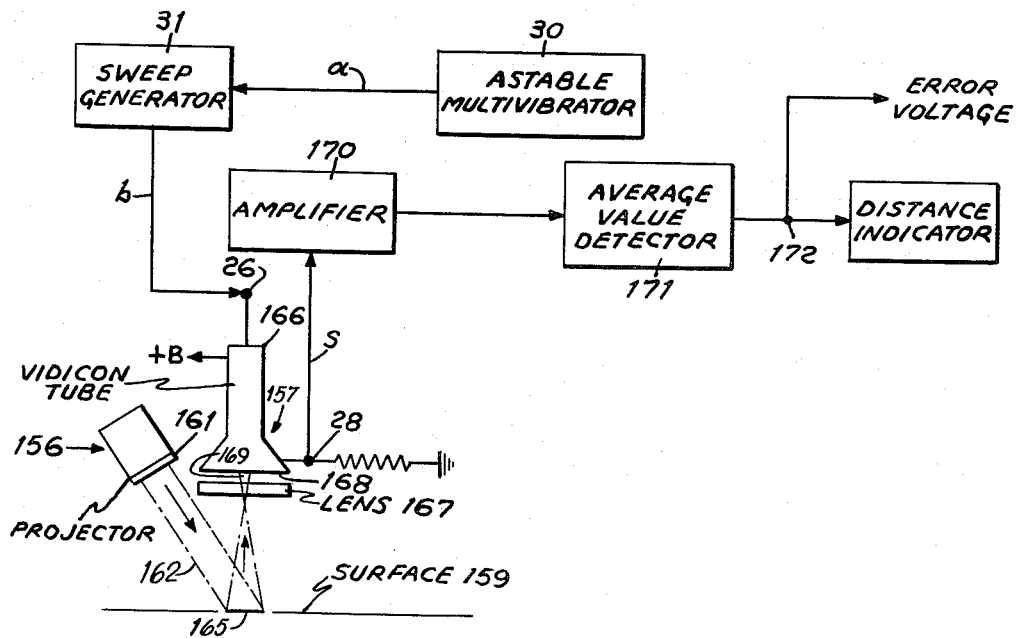
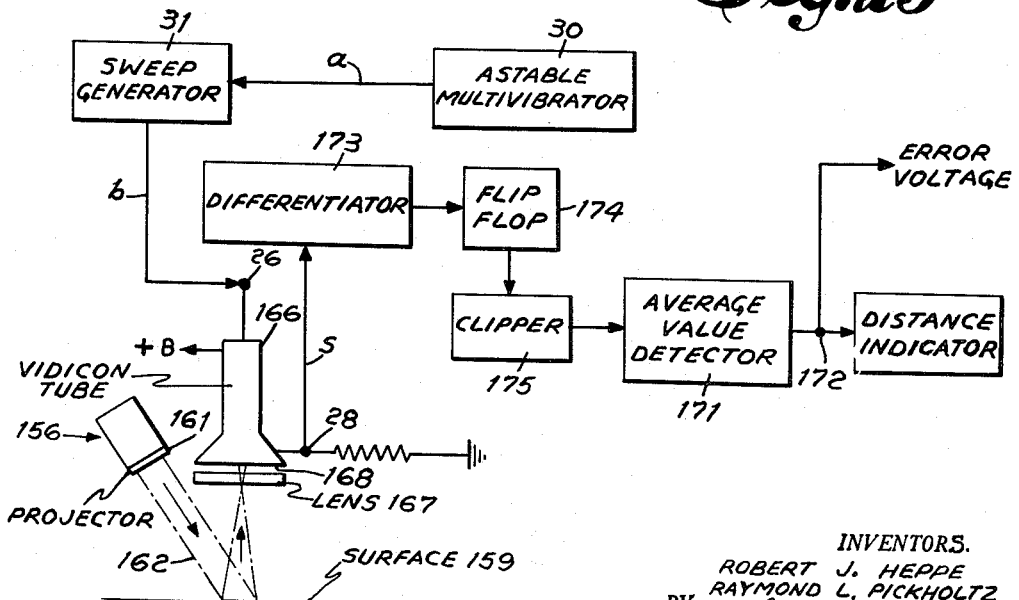

' # United States Patent Office 3,180,205
Patented Apr. 27, 1965

3,180,205
DISTANCE MEASURING APPARATUS HAVING
A DIGITAL OUTPUT CIRCUIT
Robert J. Heppe, North Caldwell, and Raymond L. Pickholtz, West Englewood, N.J., assignors to International Telephone and Telegraph Corporation, Nutley, N.J., a corporation of Maryland
Filed June 9, 1960, Ser. No. 34,946
7 Claims. (Cl. 88—1)

Our invention relates to distance measuring apparatus and is particularly concerned with means utilizing active radiation from the apparatus in order to create data for the measurement of the distance from the apparatus to a surface.

In the prior art, many techniques are known for measuring distance using both active and passive means. Some of the principles have been embodied in distance measuring devices, such as altimeters, range finding devices and interferometers. Some types of altimeters have utilized electromagnetic radiation transmitted from the aircraft and reflected from the ground to measure the altitude or distance from the aircraft to the ground. Such altimeters have had many undesirable features. For example, the radiation from the transmitter of such a device employs waveforms of a special nature and it is necessary to precisely synchronize the receiver with the transmitter. Also the precision of measurement of such devices is not readily varied. To obtain precise measurement of distance, such radar-type altimeters must measure time intervals with great precision involving measurements on the order of a fraction of a microsecond. Such devices have involved relatively complex electronic circuitry to provide the proper waveforms for the transmitter, to synchronize the receiver, and to provide the proper processing of the radiation received by the receiver. In addition, this type of apparatus is not suitable for measuring relatively short distances on the order of less than 10 feet, for example.

There are other classes of devices which utilize principles of interferometry. These devices measure distance in terms of the wavelength of the radiation by examining interference patterns which are produced on the surface the distance to which is to be measured. These techniques produce very great accuracy. However, the apparatus is normally rather bulky and fragile and the degree of precision produced is not ordinarily required for most applications. The associated electronic circuitry that such equipment requires is also quite complex. Devices utilizing interferometric techniques are suitable especially for measuring very short distances and when distances of any considerable length are to be measured, such devices cannot be used.

There are still other classes of devices, such as automatic range finders. These are passive devices which utilize the radiation from objects which is produced by the objects' own temperature or by reflected radiation from the sun or other sources of illumination. Such devices suffer from the defect that to measure the distance it is required that there be an object or target that stands out from the surrounding background. These devices are incapable of measuring distance to a relatively uniform surface, because they find nothing to act as a target on which to fix their operation.

It is an object of this invention to provide an active device which measures the absolute distance from the device to a surface.

It is another object of this invention to provide a distance measuring apparatus which is readily portable or movable.

It is a further object of this invention to provide a distance measuring apparatus which can be adapted to measure a wide range of distances with a high degree of accuracy.

An additional object of this invention is to provide a system for measuring distance which can be readily adaptable to provide various degrees of precision in measurement.

It is an object of this invention to provide an active, absolute altimeter.

It is a feature of this invention to project beams of radiation of one or more wavelengths upon the surface, the distance to which is to be measured. The reflection from the intersection of this beam or beams with this surface is sensed by a fixed or a movable receiver. As the distance from the apparatus to the surface changes, changes take place in the size and/or, relative location of the intersection of the beams with the surface so that for any particular distance to the surface, the output of the receiver or scanner is distinctly characterized.

It is an additional feature of this invention to project two intersecting beams of radiation upon the surface to which the distance is to be measured. These beams of radiation are so trigonometrically arranged with respect to each other and two receivers that for any particular distance from the apparatus to the surface, there is a particular separation between the intersections of the two beams with the surface. The two receivers or scanners optically scan the two spots of radiation on the surface and determine the separation between these two spots or intersections. The associated circuitry converts this separation into a signal with both sense and magnitude indicating the distance from a reference distance to the surface.

The above-mentioned and other features and objects of this invention will become more apparent by reference to the following description taken in conjunction with the accompanying drawings, in which:

FIG. 2 is a schematic and block diagram for the embodiment shown in FIG. 1;

FIG. 3 is a series of timing diagrams showing the waveforms at various points in the block diagram of FIG. 2 in relation to each other.

FIG. 4 is a plot of the required characteristics of the phase detector shown in FIG. 2;

FIG. 6a is a diagram illustrating a second embodiment of the invention;

FIG. 6b shows the relationship between the geometry of FIG. 6a and the pulses which are derived from this geometry;

FIG. 7a shows a schematic and block diagram for the embodiment of FIG. 6;

FIG. 7b illustrates one of the circuits of FIG. 7a,

FIG. 12 is a block diagram illustrating the operation of the embodiment of FIG. 10;

FIG. 13 is a perspective drawing showing some of the details of construction of the scanner shown in FIG. 12;

Figure 19:
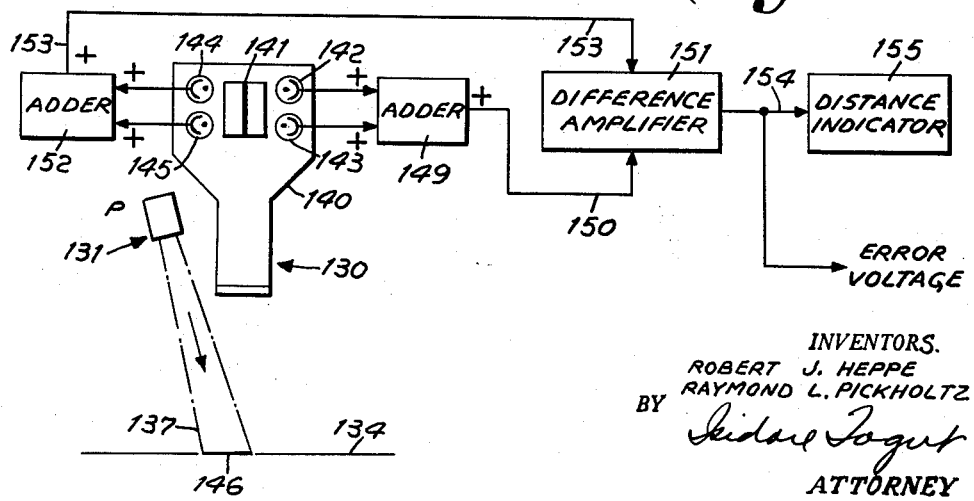
Figure 17:
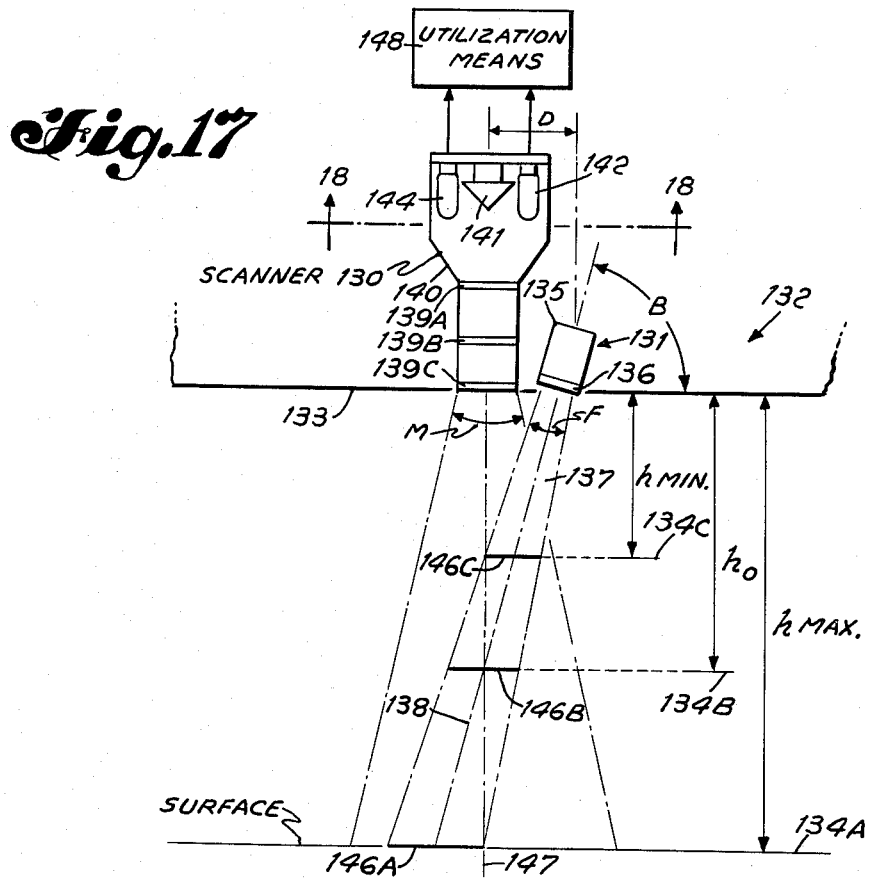
FIG. 17 is a side view showing a fourth embodiment of the present invention.
Figure 18A:
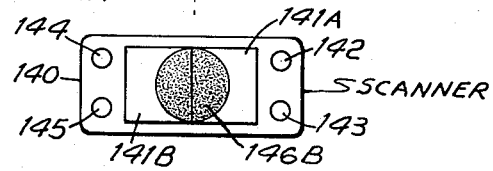

FIGS. 18a, b and c illustrate the field of vision of the scanner shown in FIG. 17;

FIG. 19 is a block diagram of the embodiment shown in FIGS. 17 and 18;

FIG. 20 is a side view illustrating a fifth embodiment of the invention;

FIG. 21a is a view of the images produced on the face of the scanner used in the embodiment of FIG. 20;

FIGS. 21b, 21c and 21d show the resulting pulse outputs from the scanner of FIG. 21a.

FIG. 22 is a block diagram illustrating the arrangement of electronic components for the embodiment shown in FIG. 20;

FIG. 23 is an alternative block diagram showing the arrangement of components for use with the embodiment of FIG. 20.

Figure 1:
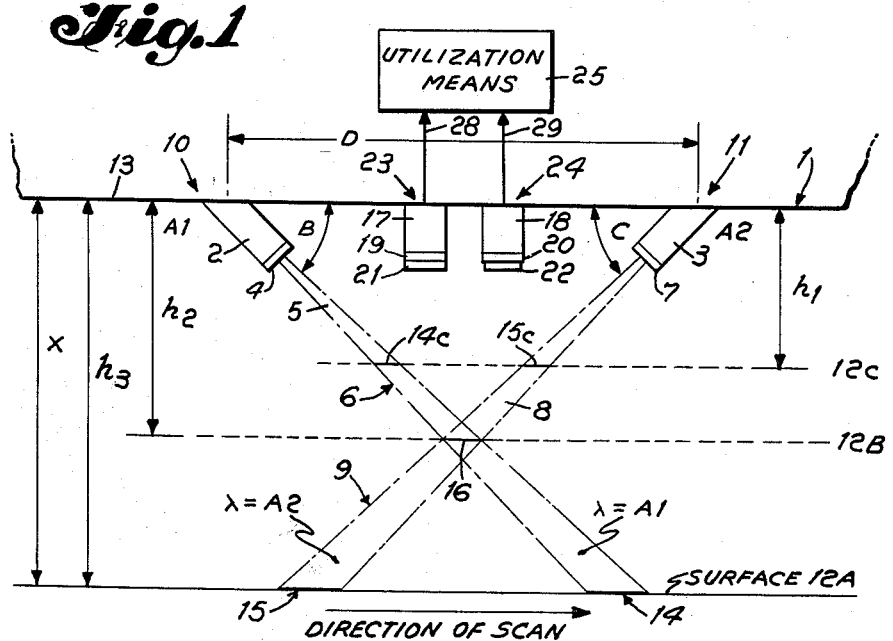
FIG. 1 is a side view illustrating the arrangement of elements of the first embodiment of this invention.

Referring now to FIG. 1 the apparatus is shown mounted on a support 1, and includes two sources of electromagnetic radiation, elements 2 and 3. The two sources of radiation, 2 and 3, may emit visible light, ultraviolet radiation or infrared radiation. In some applications, in the control of machine tools, for example, visible light may be desirable for maintenance and alignment purposes. In other applications, for example, in an altimeter for use on an aircraft, it might be desirable to use ultraviolet or infrared radiation, to avoid detection from the ground, but the principles involved are the same whatever particular wavelength ($\lambda$) is used. A lens system 4 is mounted on the front of source 2 and may consist of one or more lenses for focusing and directing the beam 5 emitted from source 2. The lens system 4 may consist of one or more lenses utilizing well known optical principles. For the instant embodiment, there are only two requirements placed upon the nature of beam 5. First, beam 5 must be radiation of a definite predetermined wavelength (A1). This wavelength A1 of the radiation emitted by source 2 can be anywhere within the range mentioned, visible light, ultraviolet or infrared. The second requirement placed on beam 5 is that the leading edge 6 of beam 5 must be fairly well defined. Such a beam with a well defined edge can be obtained by a simple lens system such as a slit or aperture in a plate, for example. Thus lens system 4 might simply be a slit in a plate. The necessity for the sharp leading edge 6 will be explained below. Likewise, the second source 3 has a lens system 7 for focusing and directing the beam 8 emitted by source 3. Again, there are only two requirements placed upon the beam 8 from projector 3. The first is that the leading edge 9 of beam 8 must be fairly well defined. The second requirement for beam 8 is that it must be of a definite wavelength (A2) which is different from the wavelength (A1) of the beam 5. Thus, the beam 8 emitted by source 3 must be of a different wavelength A2 than the radiation in beam 5 emitted by source 2. Again, the wavelength A2 used for beam 8 can be anywhere within the visible, infrared, or ultraviolet spectrum so long as it is distinguishable from the wavelength A1 used for beam 5.

Thus, the source of electromagnetic radiation 2 in the lens system 4 makes up a first transmitter or projector 10 of electromagnetic radiation producing a beam of radiation 5. Likewise, the source of electromagnetic radiation 3 along with lens system 7 make up a second transmitter or projector 11 producing a beam of radiation 8. The beams 5 and 8 from projectors 10 and 11 are directed toward a surface 12a. Projector 10 is so located with respect to support 1 that projector 10 makes an angle B from the horizontal or reference direction. It should be emphasized that FIG. 1 can be taken as a top plan view of the embodiment or it can also be taken as a side elevational view and the actual disposition of the system in space makes no difference; it is only the relative location of apparatus and surface 12A which is important. For convenience, we will refer to the reference direction as being horizontal and parallel to the mounting plane 13 on which projectors 10 and 11 are mounted. But it is to be understood that mounting plane 13 may have many other actual dispositions in space. Thus, projector 10 makes the predetermined angle B from mounting plane 13. Likewise, projector 11 is so mounted with relation to mounting plane 13, that the beam 8 from projector 11 forms the angle C with plane 13. Both beams 5 and 8 intersect the surface 12A in definite intersection areas; beam 5 intersects surface 12A in intersection area 14, and beam 8 from projector 11 intersects surface 12A in intersection area 15. Beams 5 and 8 are directed at given angles B and C so that beams 5 and 8 intersect each other at intersection area 16. The two projectors 10 and 11 are separated by a distance D denoted in FIG. 1. The required relationships between distance D and angles B and C will become apparent from the discussion below.

Also mounted on support 1 are two receivers, 17 and 18. Thus, receiver 17 is fitted with a lens system 19 for focusing and directing within receiver 17 the beam of radiation originating by reflection at 14, the intersection of beam 5 and surface 12A. Likewise, receiver 18 is fitted with the lens system 20 for focusing and directing within receiver 18 the beam of radiation originating by reflection from the intersection 15 of beam 8 and surface 12A. In addition, receiver 17 is fitted with a filter 21 which allows only radiation of the wavelength (A1) by source 2 and projector 10 to enter into and act upon receiver 17. Likewise, receiver 18 is fitted with the filter 22 which only allows the wavelength A2 emitted by source 3 and projector 11 to enter into and act upon receiver 18. It is possible in certain types of construction to omit filters 21 and 22 as will be explained below. For convenience, we denote receiver 17, lens system 19 and filter 21 as the first scanner, 23. Likewise, for convenience, we denote receiver 18, lens system 20 and filter 22 as second scanner 24. Thus, the first scanner 23 is responsive only to radiation of wavelength A1 produced by projector 10 and second scanner 24 is responsive only to radiation produced by projector 11 of wavelength A2.

Both scanners 23 and 24 scan or observe the surface 12A in the direction shown in FIG. 1. This scanning can be accomplished by physical motion of the projector, or by electronic means. Both types of scanning will be described in detail later in this application.

The operation of the embodiment of FIG. 1 can now be explained. The two beams of radiation 5 and 8 produce two spots, or targets, 14 and 15 which are the intersections of the beams 5 and 8, respectively, with the surface 12A. Both scanners begin to examine the surface 12A starting to the left of the FIGURE 1, and moving towards the right. This scanning action takes place many times per second at a convenient scanning rate. A typical electronic scanning rate might be one kilocycle per second, in other words, 1000 scanning cycles per second. As the scanners 23 and 24 begin to look at surface 12A directing their attention from the left of the figure to the right, as shown by the arrows, first one scanner will observe the reflections from one of the intersections and then at some time later the other scanner will observe and respond to the reflection from the other intersection. The distance to be measured is the distance between the apparatus, mounted on plane 13, and the surface 12A. This distance is shown as X in FIG. 1. Assume that initially the distance X is that indicated as $h_3$ which is still unknown. With distance X at value $h_3$, as the scanners examine surface 12A, the following takes place. Scanners 23 and 24 will both receive radiation from spot or target 15, at the same instant. But spot or target 15 is formed on surface 12A by the intersection of beam 8 originating from projector 11, and the radiation reflected from target area 15 towards scanners 23 and 24 still has the wavelength A2 as determined by source 3 in projector 11. Thus, the radiation from spot 15 will reach scanners 23 and 24 at the same time. Also, both scanners will look at spot 15 at the same time. However, only the second scanner 24 will respond to this radiation because filter 21 on scanner 23 will prevent scanner 23 from responding in any way to the spot 15. Thus, as scanners 23 and 24 encounter spot 15, an output will originate at that instant from the second scanner 24 only. As the scanners continue to examine the surface 12A moving from left to right, both scanners will next encounter radiation reflected from the spot or target 14. But spot or target 14 is created by beam 5 from projector 10, and the radiation reflected from spot 14 has the wavelength A1 as determined by source 2 and projector 10. Now only the first scanner 23 will respond to target 14 because the filter 22 in the second scanner 24 will not permit the second scanner 24 to respond to radiation from spot 14. As both scanners, 23 and 24 examine spot 14 on surface 12A an output will originate only from the first scanner 23. Thus, for a complete scanning cycle moving from left to right, there will first be an output from scanner 24. Then, at some time later, there will be an output from scanner 23. The utilization means connected to the outputs of scanners 23 and 24 measures the time separation between the outputs from the two scanners, and provides an indication of altitude obtained from such time separation. If the scanning speed is uniform moving from left to right, there will be a direct proportion between the time separation of the pulses at the outputs of scanners 23 and 24 and the distance separation of targets or spots 14 and 15 on the surface 12A.

Assume that the surface 12A and the support 1 move closer together so that the new distance separating these two is given as $h_2$. This distance $h_2$, is the distance corresponding to the point where the two spots intersect each other at 16. The distance $h_2$ is that corresponding to the condition of beams 5 and 8 intersecting each other, forming at this one particular distance only one illuminated spot on surface 12A. Thus, the surface 12A has moved to the position shown as 12B by the broken line passing through the intersection of the two beams. Now, when the scanners scan their field of vision, each scanner will encounter only one spot or target to which it will respond. As before, each scanner will respond only to the particular wavelength for which it is set up as described above. But when the distance X is that given by $h_2$, the output from both scanners will occur at exactly the same time because both scanners will encounter a target which they can respond to at the same point in their scanning cycle. Thus, the particular height $h_2$ where the two beams cross, is characterized by the fact that there is no time separation in the outputs occurring from the two scanners 23 and 24. This particular distance $h_2$ can be used as a reference distance. It will be noted for X having values greater than $h_2$, such as $h_3$, separations between the spots 14 and 15 is not unique. For each distance greater than $h_2$, there is a corresponding distance less than $h_2$, for example $h_1$, where the very same distance and time separation may occur between the two spots 14 and 15. But it will be shown that the scheme shown in FIG. 1 allows an unambiguous determination of which of the two ranges the distance X actually lies in, that greater than $h_2$ or that less than $h_2$. This can be done because the intersection of the two beams provides a point from which the sense of the signal received from the two scanners 23 and 24 can be determined. To illustrate, assume that the surface 12A moves even closer to support 1 to the new position indicated by the distance $h_1$ and assumes the position 12C. Now note that beam 5 from the first projector 10 will intersect surface 12C in a target spot shown as 14C and the beam 8 from projector 11 will intersect surface 12C in the spot denoted as 15C. As before, the scanners 23 and 24 will examine the surface 12C in unison, the direction of scan as before being from the left to the right. Both scanners 23 and 24 will first encounter spot 14C in their field of vision as they scan. The radiation reflected from spot 14C has the wavelength A1, as previously described. Thus, the scanner 24 will not respond to target spot 14C at all. However, scanner 23 will respond to target spot 14C because scanner 23 has been arranged to respond only to radiation of wavelength A1 such as emitted by source 2 in projector 10. Thus, during one scan cycle, as the scanners 23 and 24 examine their field of vision moving from the left to the right, scanner 23, with receiver 17 will encounter and respond to spot 14C. At a later time, both scanners will encounter spot or target 15C on surface 12C. However, only scanner 24 will respond to reflection from spot 15C because filter 21 on scanner 23 will prevent scanner 23 from responding to radiation from spot 15C. Thus the sequence of events will be this: first scanner 23 will produce an output; then at some later time, scanner 24, will produce an output. Reference to the discussion above when the distance was at a value $h_3$ will show that previously an output was caused by radiation of wavelength A2 in spot 15 and then later an output was caused by radiation from spot 14 of wavelength A1. The occurrence of the two wavelengths has now been reversed, and now wavelength A1 causes the first output from receiver 17 by means of spot 14C and then later wavelength A2 and beam 8 causes an output from receiver 18, from reflections from spot 15C. Thus, the use of the two different wavelengths and two receivers each responsive to only one wavelength has produced a system which will produce an indication of altitude which has both sense and magnitude.

Thus, if scanner 23 first responds to wavelength A1, then the distance from the support 1 to surface 12 must be less than the value $h_2$. Such a value is $h_1$ as has been just illustrated. On the other hand, if scanner 24 first responds to wavelength A2, then the distance from the support 1 to the surface 12A must be greater than the distance $h_2$. Such a distance is $h_3$ and it was used to explain the beginning of the discussion of the invention. When the outputs from the two scanners occur at exactly the same time, there is only one particular distance $h_2$ which corresponds to this condition. The output from the two scanners are introduced to utilization means 25 which measures the time separation between the occurrence of outputs from the two receivers. If a linear speed of scan is used, there is a direct analog between the time separation of the two outputs from the two scanners and the elevation corresponding to this separation. It can be seen that by proportional triangles as the distance from support 1 to surface 12 is increased beyond distance $h_2$, the separation between spots 15 and 14 will increase in direct proportion. Likewise, it can be seen that if the distance between object land surface 12A is less than $h_2$, the separation between spots 14C and 15C, for example, will also increase as the distance grows smaller and smaller and support 1 and surface 12A move closer and closer together. It should be noted that it makes no difference if surface 12A is moving transversely with respect to support 1 because the projectors 10 and 11 create virtual targets by their illumination of the surface and the location of these virtual targets 15 and 14 are fixed by the geometry of the arrangements of the apparatus itself. Transverse motion of the surface 12A parallel to the direction of the scanning arrow will make no difference in the operation of the device. Motion is measured along the line perpendicular to plane 13, and surface 12A. FIG. 1 has been drawn for ease of illustration with angles B and C being approximately equal, but this is not necessary. Angle B need not be equal to angle C and projectors 10 and 11 do not have to be located along a horizontal line. One projector can be at a higher or larger distance from surface 12 than the other. In addition, it is not necessary that scanners 23 and 24 lie in the same plane with projectors 10 and 11. Scanners 23 and 24 can be set back in depth from the plane which contains the two projectors 10 and 11 and the two beams 5 and 8. All that is necessary is that the two beams 5 and 8 intersect at a common point at a predetermined distance from plane 13 and that the distance D between the projectors 10 and 11 and the angles B and C be known. This may change the variation in the scale corresponding between time separation of the outputs of the scanners 23 and 24, and corresponding distance. The utilization means 25 can be readily arranged to accommodate such a different variation or change in scale.

FIG. 2 shows in some detail a block diagram utilizing the invention of FIG. 1 showing typical electronic circuitry to provide an indication of the distance X. It should be noted that the reflections in FIG. 1 are not strictly "optical" reflections; that is, radiation is assumed to travel in straight lines in FIG. 1. However, at the intersections of the beams with the surface 12A at 15 and 14, the angle of incidence does not equal the angle of reflection of the radiation. This is because surface 12A it assumed to be of sufficient roughness or coarseness to cause a scattering and diffusion of the incident radiation so that targets 14 and 15 can actually be viewed from any angle by the scanners 23 and 24. It would be extremely unusual to find any surface other than a mirror to be so smooth that the angle of incidence would equal the angle of reflection exactly so that spots 14 and 15 could only be viewed from one angle. Under most conditions, scanners 23 and 24 will be able to observe spots 14 and 15 from any arbitrary angles that are convenient because of the diffusing and scattering action of surface 12 upon radiation incident in beams 5 and 8. In FIG. 2, projector 10 emitting a beam of radiation 5 which has wavelength $\lambda_1$ equal to A1 is shown in abbreviated form and projector 11, as described in FIG. 1, is shown emitting a beam of radiation 8 which has wavelength $\lambda_2$ equal to A2. Scanner 23 is composed of lens 19 and filter 21 as mentioned before, and an electronic scanning tube 17', such as a vidicon tube. Such tubes are well known in the art and are commercially available. Likewise, scanner 24 is composed of lens system 20, filter 22 and electronic scanning tube 18'. Electronic scanning tubes 17' and 18' can be exactly the same types of tubes. The discussion here will be made assuming that 17' and 18' are vidicon type tubes. They are used in television systems as camera tubes. Image orthicon-type tube can also be used as electronic scanning tubes 17' or 18' since the operation will be exactly analogus to that of vidicon tubes. Both types of tubes are described in some detail on pages 981 through 986 of "Electronic and Radio Engineering" edited by Frederick E. Terman, published by McGraw-Hill Book Company, Inc., New York 1955.

The vidicon tube has a number of standard inputs and an output. We are concerned here only with one input, namely, one of the two sweep inputs. This sweep input causes the electron beam within the tube to be successively moved across the face of the tube. As it encounters light which is focussed upon the face of the tube, an output is produced at the output terminals of the tube. The sweep input to vidicon tube 17' has been indicated at terminal 26 and the sweep input terminal to vidicon tube 18' has been indicated at terminal 27. A normal vidicon tube has two sweep inputs, one for the vertical deflections and one for the horizontal deflections. The present system requires sweeping in only one direction which could be taken as either the horizontal or the vertical simply by rotating the vidicon tube. Therefore, vidicon tubes used in the present system could be somewhat simpler in construction than the normal type vidicon tube effecting a possible saving in cost. The same sweep signal is used and connected in parallel to vidicon tubes 17' and 18' so that the two tubes are swept in synchronism. The output terminal of vidicon tube 17' is indicated at terminal 28 and the output of vidicon tube 18' is indicated at terminal 29. Thus, terminal 28 is the output of scanner 23 and terminal 29 is the output of scanner 24. The power supplies, focusing controls, and so on have been omitted for simplicity. The two scanning tubes 17' and 18' with their filters and lens systems, are arranged in close proximity to each other so that the field of vision of each scanner is essentially the same. The two tubes are also swept in unison so that each tube examines the same part of the field of vision as the other tube at the same instant in time. This establishes the required relationship between the outputs in time of the two tubes. Projector 10 which contains source 2 and emits beam of radiation 5 with wavelength A1 has been disposed to show reflections from beam 5 arriving only at vidicon tube 17' of scanner 23. Actually reflections from beam 5 and projector 10 will arrive at both vidicon tubes but because of the filter arrangement which we have pointed out in FIG. 1, only vidicon tube 17' will respond to radiation of wavelength A1, so that for simplicity the drawing in FIG. 2 has been made in that manner. Likewise, the radiation from source 2 within projector 11 and emanated in beam 8 of wavelength A2 has been shown entering second scanner 24 and being focussed upon the face of vidicon tube 18'. Likewise, reflections from beam 8 will actually enter the scanner 23 and also be focussed upon the face of vidicon tube 17'. But only scanner 24 will respond to radiation of wavelength A2 because of filter 21 as discussed above. Thus, the two scanners examine the surface 12A in unison looking at the same point on surface 12A at the same instant in time. But at any given instant, only one of the two vidicon tubes 17' and 18' can respond with the exception of the one point where the two beams cross and intersect in point 16. Under that condition, both vidicon tubes will respond at the same instant. The lens systems 19 and 20 are so arranged that the images of the spots 14 and 15 will be focussed respectively upon the surface of vidicon tubes 17' and 18'.

FIGURE 3 shows a series of timing diagrams. The lower case letters by each waveform in FIG. 3 correspond to the lower case letters shown in the block diagram of FIG. 2, so that the waveforms at each point in the block diagram of FIG. 2 can be visualized by reference to the corresponding waveform shown in FIG. 3. The time base for this system is provided by an astable, or free-running multivibrator 30. The output of the astable multivibrator 30 is shown as curve $a$ in FIG. 3. The output of the astable multivibrator 30 goes to a sweep generator 31. It is also sent to phase detector 32 to provide a reference input. The output from astable multivibrator 30 provides a trigger which starts and stops the sweep generator 31. Sweep generator 31 provides a linear sweep lasting over the entire period of the timing multivibrator 30. The output of the sweep generator 31 is shown as curve $b$ in FIG. 3. The duration of the sweep is T seconds and the scanning repetition frequency (F) is $$F = \frac{1}{T}$$

cycles per second. The output of sweep generator 31 is sent in parallel to the input terminals of both vidicon tubes at terminals 26 and 27. Thus, the two vidicon tubes are swept in synchronism and as a result, they examine the field of vision looking at corresponding physical points at corresponding times.

When the sweep voltage is introduced in the vidicon tubes 17' and 18', they produce no output until such time when the scanning voltage is such that the portion of the face of the vidicon tube is scanned, which has an image formed by one of the two target spots 14 or 15 on surface 12A. When the vidicon tube as it is swept encounters an image on the face of the vidicon tube during the sweep, an output is produced lasting as long as there is a bright spot on the face of the tube, while the sweep voltage passes over this spot. Curves c and d in FIG. 3 show the respective outputs of vidicon tubes 17' and 18'. For convenience the tube 17' is denoted the A1 tube because it is responsive to radiation of wavelength A1 only. Also tube 18' is denoted as the A2 tube. Note that there is an output first from vidicon tube 17'. This corresponds to a distance X between support 1 and surface 12A which is less than value $h_2$. Thus there is produced an output first of vidicon tube 17' of scanner 23 and then, some time later, vidicon tube 18' produces an output corresponding to reflections from spot 15C in surface 12C. As has been pointed out, it is important to determine which receiver produces the first output. The circuitry is arranged to do this. The output from vidicon tube 17' at terminal 28 is sent into a differentiating circuit 33. Likewise, the output of vidicon tube 18' at terminal 29 is sent in to another differentiating circuit 34. The output of differentiator 33 is shown as curve e in FIG. 3 and the output of differentiator 34 is shown as curve f. The differentiator circuits 33 and 34 perform two functions. They provide a sharp output obtained from the leading edges of the pulse outputs c and d of vidicon tubes 17' and 18'. By differentiating the pulse outputs, the leading edges of the two pulses are examined. Also the differentiator circuits clip off the negative portions of the waves so that only the leading edge of the output c and d in FIG. 3 are examined by the succeeding circuitry. It was mentioned in connection with FIG. 1, that it is only necessary that the leading edges of the beams 5 and 8 be sharply defined. The actual width of the beams is of little importance. This is because the differentiator circuits 33 and 34 only allows an output responsive to the leading edges of the pulses c and d. The actual area covered by the spots 14 and 15 formed by the intersection of the beams 5 and 8 with the surface 12A is of little importance as long as the spots are of sufficient width to provide an output that can be recognized by the differentiators 33 and 34. This makes the construction of projectors 10 and 11 simpler and cheaper, because all time measurements will be made with respect to the leading edges of the pulses c and d. It should be noted, several scanning cycles are shown in the waveforms of FIG. 3. Scanning may be performed at any convenient rate, for example, 1 to 100 kilocycles per second. The scanning rate will determine partly the degree of precision of the measurement. The scanning rate can be selected to provide the convenient corresponding scale between time measurement and the distance measurement of X. For example in a radar type altimeter the speed of propagation of light determines the accuracy to which time measurements must be made. In a pulse radar type altimeter the scale is 492 feet of distance per microsecond as determined by the speed of light. Hence in a radar type distance apparatus a one microsecond error in measuring time would produce 492 feet of error in the distance measurement. By contrast assume the present invention uses a scan rate of 1 kc. thus $$T = 1 \text{ millisecond}$$

$$f = \frac{1}{T} = 1000 \frac{\text{scan cycles}}{\text{second}}$$

With f=1 kc. a scale of one foot per microsecond can be readily provided since in one millisecond the scanner could be arranged to scan 1000 linear feet by any of the geometrical arrangements shown. Hence a measurement error of one microsecond in the present invention would produce only one foot of error in the measured distance. Slower or faster scanning rates can be chosen depending on the accuracy desired, the distance to be scanned, and the precision to which time will be measured.

Reference to FIG. 2 will show that the output of differentiator 33 is coupled to the "set" input 35 of the A1 flip-flop 36. Flip-flop 36 is denoted as the A1 flip-flop because it is responding basically to radiation of wavelength A1 from the projector 10. The output of differentiator 33 is also coupled into a delay circuit 37 also, and the output of delay element 37 is coupled to the "reset" input 38 of flip-flop A2 denoted as 39. Thus, the output of differentiator 33 shown as curve e in FIG. 3 goes to the set input of A1 flip flop 36 and to the reset terminal 38 of A2 flip flop 39 after a short delay provided by element 37. In a similar manner, the output of differentiator 34 is connected to the set input 40 of the A2 flip flop 39. Also the output of differentiator 34 is connected first to delay element 41 and then to the reset input 42 of the A1 flip flop 36. Thus, the differentiated outputs e and f of the vidicon tubes 17' and 18' are cross connected to the two flip flops 36 and 39.

The term "set input" is defined as follows. When a positive pulse is introduced into a "set input" the flip flop changes into a first state, the "set" state. The "reset input" is defined as follows. When a positive pulse is introduced into the reset input of a flip flop, the flip flop changes into the opposite state, 180° out of phase from the set state; this is the "reset" state. This is illustrated by curves g and h in FIG. 3. Curves g and h represent the outputs of the flips flops 36 and 39 in response to the input waves e and f of FIG. 3. Thus, when the positive differentiated pulse e enters the set input of flip flop 36, flip flop 36 changes from the reset condition of the flip flop with low voltage output to the set condition of the flip flop, the high positive output, as shown by curve g. It should be noted that the arrangement of connections locks flip flop 36 and flip flop 39 together so that they are always exactly 180 degrees out of phase. When flip flop 36 goes positive, flip flop 39 goes negative and vice versa. Thus, the positive differentiated pulse e also causes flip flop 39 to go into the reset state, as shown by curve h. A very small amount of delay introduced by element 37 is not shown in curve h. The purpose of the delay elements 37 and 41 will be explained below.

At some later time, the differentiated pulse f output from differentiator 34, causes flip flop 39 to go into the set state. This same f pulse, causes the flip flop 36 to go into the reset state. The outputs of flip flops 36 and 39 waveforms g and h are always out of phase with each other because of the cross connections of the set and reset inputs to the flip flops. The output of flip flop 36 is fed into input 43 of difference amplifier 44. The output of flip flop 39 is put into the other input 45 to the difference amplifier 44. The difference amplifier circuit 44 has the property that it takes the difference between its two inputs 43 and 45 and produces this difference as the output signal at its output terminal 46. Difference amplifier 44 takes the difference: (plus terminal 43—minus terminal 45) shown by curve j in FIG. 3. If the phase of the inputs at 43 and 45 reverses, the output of the difference amplifier at 46 will also reverse in phase. The output of the difference amplifier is put into the second input to the phase detector 32. As mentioned before, the first input to the phase detector is the basic timing waveform provided by the astable multivibrator 30. It can be seen that there is a difference in phase shown by $\phi$ between the output of the difference amplifier at 46 and the reference input provided by the astable multivibrator 30. The output at 47 of the phase detector provides a voltage in proportion to this phase difference $\phi$. FIG. 4 shows the input-output characteristics of the phase detector. Thus, the ordinate shows the positive or negative voltage provided by the output of the phase detector. The abscissa is shown in terms of distance or phase angle $\phi$. The phase difference $\phi$ between the output of the difference amplifier and the basic timing reference provided by circuit 30 directly corresponds to the distance X as measured from the crossover point at distance $h_2$. The crossover point in the phase detector 32 is actually the distance $h_2$ at which the beams 5 and 8 intersect in one common area. This is shown on FIG. 4 as "the beam intersection distance" where the output of the phase detector 32 is zero volts. Note that the use of two distinct wavelengths and the geometry of FIG.

I have provided for this change in phase for distances above and below a reference distance $h_2$.

The output of the phase detector 47 is sent through a low pass filter 48 to remove any ripple and to provide a smoothly varying output waveform. The output of the low pass filter 49 is actually the smooth output of the phase detector 47. This is a voltage as shown in FIG. 4, which increases in magnitude as the distance away from the crossover value increases, and the polarity of the voltage indicates whether the distance is less than the distance $h_2$ the crossover point or more than the distance $h_2$. Thus, the plus axis of FIG. 4 corresponds to an A2 pulse being detected first. The negative polarity in FIG. 4 is shown for the condition of the first output corresponding to the A1 wavelength and the largest negative value of voltage corresponds to the lowest value of distance X which can be measured. As distance X increases, the output of low pass filter 49 moves up the curve of FIG. 4 towards the crossover point at $h_2$. At the crossover point the distance is $h_2$, X equals distance $h_2$, and the output of the low pass filter is zero. As distance X increases beyond $h_2$ to such a value as $h_3$, for example, the output voltage further increases. Thus, a voltage is provided at 49, the output of low pass filter 48, which is a direct analog of the distance X between the support of the apparatus 1 and the surface 12A. This distance is an error voltage and is actually the distance $h_2$ minus X, and with sense as shown. The error voltage 49 is fed to a distance indicator 50. This distance indicator 50 could take many forms, one of which would be a D.C. voltmeter whose scale would be calibrated in terms of distance X. Another example would be a voltmeter with digital readout, so that the distance X would be displayed on separate dials as a digital number. A number of other possible arrangements could be used to indicate the distance X for display purposes for an operator.

Figure 5:
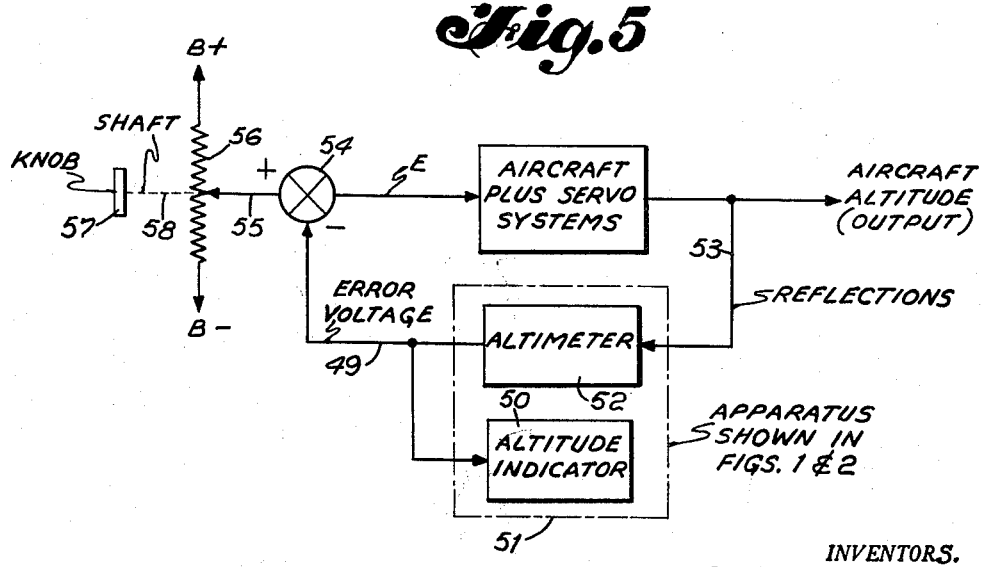
FIG. 5 is a block diagram illustrating how the embodiments of FIGS. 1, 2, and 3 may be utilized in a closed loop servo system to control distance.

But the error voltage 49 can be taken out and used directly as a control voltage rather than an indicating voltage or it may be used as both. For example, FIG. 5 shows a scheme for using the present device in a closed loop servo control system for controlling the altitude of an aircraft. For example, low flying drones or missiles which attempt to hug the ground could use the present invention to maintain a constant altitude above the surface of the earth to avoid detection by enemy radar and for other tactical purposes. FIG. 5 shows the use of the invention of FIGS. 1 and 2 in a closed loop servo system for controlling the altitude of an aircraft. The aircraft might be a missile or a drone and the apparatus in this invention is particularly suited for holding the aircraft at relatively low altitudes above the ground. The apparatus shown within the dashed lines in FIG. 5 indicated as 51, includes all the apparatus shown in FIGS. 1 and 2 operating in the manner described above. The system will also provide an indication of the altitude, if desired. An altitude indicator 50 is shown within block 51. It is similar to the distance indicator 50 in FIG. 2. The block labeled "altimeter," numbered 52, is all of the equipment shown in FIGS. 1 and 2 with the exception of block 50. Thus, the output of block 51 in FIG. 5 is terminal 49 producing an error voltage to control the altitude of the aircraft. The input to block 51 is indicated at 53 as reflections. These are actually the reflections of the radiation from projectors 10 and 11 striking the ground and being scanned by scanners 23 and 24 in the apparatus within block 51. Thus, the input 53 is actually a measurement of the altitude of the aircraft.

The error voltage from terminal 49 is shown as being introduced into a comparator 54 that takes the difference between its two inputs. The second reference input to the comparator 54 is shown as the output voltage taken from the wiper 55 of a potentiometer 56. The position of the wiper 55 of potentiometer 56 is controlled by a knob 57 and shaft 58 or other suitable means. The two ends of the potentiometer 56 are returned to power supply voltages indicated as B+ and B— providing a positive voltage on one end and an equal negative voltage on the other end. There is a position near the middle of the potentiometer 56 where the output of the wiper 55 will be zero volts. The reason for providing the potentiometer and power supplies as an adjustable reference voltage is that the device of FIGS. 1 and 2 as shown in FIG. 5 will inherently produce a zero error voltage when the altitude is at height $h_2$ as shown in FIG. 1. This is the inherent zero or servoing point of FIG. 1. It may be desired to hold the aircraft steady at a different altitude than $h_2$. In that event, potentiometer 56 and wiper 55 are moved to a voltage corresponding to whatever particular altitude it is desired to hold the aircraft at. Knob 57 can be calibrated in terms of feet of altitude so that the aircraft can be adjusted to servo to any particular altitude. When the output of wiper 55 is zero volts, the system will inherently servo to the altitude $h_2$ as shown in FIG. 1 since this is the zero error position as indicated in FIG. 4 as the output of phase detector 32 and low pass filter 48. This output is produced at terminal 49 as shown in FIGS. 2 and 5. The difference between the reference voltage 55 and the altitude error voltage 49 produces a servo error voltage E at the output of comparator 54 as shown in FIG. 5. This is an instantaneous error voltage E which will tend to correct the motion of the aircraft. The aircraft with its associated power and control servo systems is shown as a single block. This would consist of the aircraft itself along with the control surfaces of the aircraft such as, the ailerons, the rudder, flaps, etc. The error voltage E fed to the input of the power servos of these control surfaces will produce corrective motion vertically by the aircraft to bring the aircraft back to the correct altitude if it starts to deviate from this altitude. The output of the aircraft is the aircraft altitude and this aircraft altitude forms the input to the feedback altimeter system shown as block 51. This input is indicated at 53 as the reflections as just discussed.

It should be pointed out that although we have shown as an example a closed loop servo system involving an aircraft, this distance measuring apparatus can be used in many other types of closed loop servo mechanism systems, such as, machine tools; on railroads to maintain a set distance between moving cars; on submarines to maintain a set difference below the surface of the water; and so on. It may also be pointed out if the distance indicating voltage or error voltage shown at terminal 49 in FIG. 2 is differentiated, it will provide the velocity of the surface 12 with respect to support 1. As shown, it indicates the instantaneous distance. Differentiating distance, we would get velocity. This might be useful in certain applications. Reference to FIGS. 1 and 2 will show that the scanning of field of vision of the scanners 23 and 24 has been accomplished without mechanical motion of any of the component parts of this apparatus. However, the scanning motion can be accomplished by physical motion of the scanners 23 and 24. In another embodiment of this invention we will in fact illustrate such an arrangement.

A second embodiment of the invention is shown in FIG. 6A. For illustrative purposes, FIG. 6A shows the apparatus mounted on the underside of an aircraft 59 and the device is used as an altimeter. There are many other applications of the device, as have been discussed before. The scheme of FIG. 6A involves the use of two projectors, 60 and 61, and one scanner 62. In this case, projectors 60 and 61 can be exact duplicates of each other and they may produce radiation of the same wavelength or different wavelengths, the only restriction being that scanner 62 responds to the wavelength from both projectors 60 and 61. Projector 60 includes a source 68 of electromagnetic radiation similar to source 2 which may emit visible, ultraviolet, or infrared radiation and the same remarks concerning source 2 that were made under the discussion of FIG. 1 are equally applicable here. Projector 60 further includes a lens system 64. This lens system may be made in a number of ways well known in the art and may comprise several lenses of concave and convex shape. The requirement for projector 60 is that it produce a reasonably well defined beam of radiation 65 which has a predetermined angle F between the leading edge 66 and the trailing edge 67 of beam 65. The angle of beam width F may take on a number of values depending upon the desired results. The effect of the beam width angle F upon the performance of the embodiment will be explained below. Also, the beam 65 of projector 60 is inclined at an angle B from the horizontal, as shown in FIG. 6A. Projector 61 may be similar in every respect to projector 60 and projector 61 is constructed in a similar manner including a source of electromagnetic radiation 69 and a lens system 70. Projector 61 produces a beam of radiation 71 with leading edge 72 and trailing edge 73. The angle of beam width R between the leading 72 and the trailing edge 73 of beam 71 can assume any of a predetermined set of values. However, beam width angle R is not necessarily equal to the beam width angle F of projector 60. Beam 71 of projector 61 is inclined at an angle C from the horizontal as shown. The effects of the values of the beam width angles F and R and the values of angles B and C will be explained in the discussion below.

Projectors 60 and 61 are separated from each other by a distance D, as shown. The value of D may be chosen appropriately depending upon the range of distances or altitudes to be measured. A larger value of D being somewhat more appropriate to measure larger values of altitude or distance. In FIG. 6A the beams 65 and 71 are shown as converging but these beams may also be arranged in diverging relationship. The beams may not be arranged parallel to each other. The intersection of beam 65 from projector 60, with the surface or ground 77, is shown at 75 and the intersection of beam 71 from the second projector 61 is shown as 76. For purposes of explanation, the ground has been shown in four positions, position A corresponding to that shown as 77, the original position, and three other positions shown as B, C and D. Reference to FIG. 6B shows pulse voltages which are derived from the trigonometric arrangement of FIG. 6A. Thus, in FIG. 6B, curve eA shows the pulses corresponding to ground level A. Curve eB shows pulses corresponding to ground level B in FIG. 6A and so on. The manner in which the curves shown in FIG. 6B is generated from the arrangement of FIG. 6A will now be explained. It will be noted that at the greatest altitude shown with ground level at A, the intersections 75 and 76 of the beams 65 and 71 with the ground 77 has a broad value, that is, the width of the intersection is quite large. Now assume that the aircraft 59 moved to a lower altitude such that the ground level is at B. Now the intersections 75B and 76B with the ground 77B are narrower, that is, each intersection is narrower. In addition, the two intersections 75B and 76B are more widely separated with respect to each other. As the aircraft moves to a still lower altitude, such as shown at ground level C, the intersections 75C and 76C are still narrower and they are still further separated from each other. If pulses were generated it can be seen that for any particular altitude there is a unique value of the width of the intersections 75 and 76 and there is also a unique value of the separation between the intersections 75 and 76. By the measurement of the width and/or the separation between these intersections of the beams with the ground, the measurement of altitude or distance may be accomplished.

Scanner 62 repetitively examines the ground examining successive portions moving from the left to the right, as shown by the arrow labeled "direction of scan." When scanner 62 encounters radiation reflected from the intersection of beam 65 with the ground at 75, output 78 is produced from scanner 62. As the scanner continues to examine the ground 77, its output will decrease where it encounters the trailing edge 67 of beam 65. When the scanner 62 encounters the intersection 76 of beam 71 with the ground 77, another output is produced and this output ends when the scanner 62 encounters the trailing edge 73 of the beam 71. FIG. 6B illustrates the output of the scanner 62 for the various ground levels and is a projection of the width and separation of the intersections 75 and 76 on to a time axis with voltage as the ordinate. The time axis is created by the uniform speed of scan of scanner 62 as it examines the ground plane 77. Thus, the time axis is an analog of distance measured along the surface 77 and voltage represents the output 78 of scanner 62. Examination of FIG. 6B will show that as the altitude decreases, the average value of the pulses produced by scanner 62 also decreases so that a direct analog between the average or D.C. value of the pulses in FIG. 6B and the distance of the apparatus from the surface 77 has been created. Utilization means 79 connected to the output 78 of scanner 62 measures the average value of the output 78 and provides an indication of altitude for the operator of the aircraft or provides other useful signals in accordance with the altitude so measured. Thus, measurement of the average value of the output of scanner 62 provides a measure of the altitude or separation between the apparatus mounted on aircraft 59 and the ground 77. It can be readily seen that the same apparatus can be adapted to measure the distances in many other types of applications, such as, machine tools; guiding electric buses through tunnels; and also to measure the height above ground of fog or cloud banks. Scanner 62 need not be in the same plane as the projectors 60 and 61. Also, projectors 60 and 61 need not be located on the same level with each other so long as the distance D between them is known and the orientation angles B and C of the projectors from the horizontal is known.

FIG. 7A illustrates an arrangement of equipment and electronic circuitry for operation in accordance with the embodiment shown in FIG. 6A.

Figure 8:
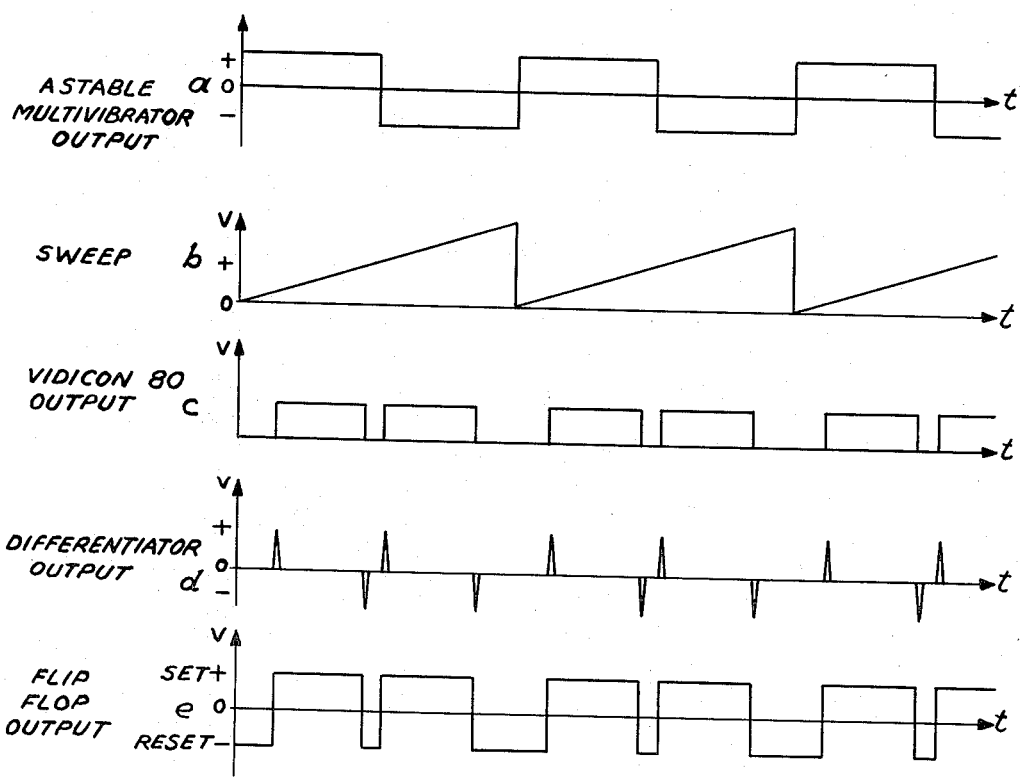
FIG. 8 is a series of timing diagrams showing the waveforms at various points in the block diagram of FIG. 7a in relation to each other.

Projectors 60 and 61 are shown with their beams 65 and 71 directed towards the ground plane 77 as in FIG. 6A. The scanner 62 is shown in more detail. The lens system 81 focuses the reflections from the intersections 75 and 76 with the ground 77 upon the face of the receiver 80. Receiver 80 as shown here is a vidicon camera-type TV tube. The image orthicon-type tube could also be used for element 80 with equal facility as discussed in connection with FIG. 2 of the first embodiment. One sweep terminal of vidicon tube 80 is shown at 26. Most vidicon tubes have two sweep terminals, one for horizontal deflections and one for vertical deflections but as pointed out before, the present device scans in only one direction so that a simpler type of tube may be used with only one scan direction available or alternately a standard vidicon tube may be used and only one of the scanning inputs used. Thus, terminal 26 can represent either the horizontal or vertical scan terminal. The output of vidicon tube 80 is indicated at terminal 28 and the vidicon tube produces an output when the scanning electron beam produced by the input to terminal 26 encounters an area of brighter illumination upon the face of the vidicon tube. The small letters a, b, c, etc. of FIG. 7A relate the output waveform shown in FIG. 8 to the various circuits of FIG. 7A. FIG. 8 is a timing diagram showing the various waveforms of the circuits of FIG. 7A in time relationship to each other. The waveform e of FIG. 8 is the pulse waveform corresponding to waveform eA as shown in FIG. 6B, when the ground level is at A. The operation of block diagram of FIG. 7A working according to the physical arrangement shown in FIG. 6A and FIG. 6B can now be explained. An astable multivibrator circuit 30 produces the basic time base waveform for the system. Curve a of FIG. 8 shows the output of the astable multivibrator 30. The output of multivibrator 30 is connected to the input of sweep generator 31. Sweep generator 31 is started and stopped by the timing waveform from astable multivibrator 30, as shown in curve b of FIG. 8. The output of sweep generator 31 is connected to one of the sweep terminals 26 of the vidicon tube 80 and provides the sweep for the scanning electron beam of the vidicon tube 80. Thus, the circuitry provides a correspondence between the time in each scanning cycle and the linear distance shown in the field of the scanner 62. Astable multivibrator 30 may run at any convenient scanning rate. A typical scanning rate might be 10 kilocycles per second, but slower or faster scanning rates may be used as desired for less or more accuracy. A slower scanning rate lowers the accuracy requirements on the circuitry and allows larger errors in time measurement to correspond to smaller errors in altitude or distance measurement. The output terminal 28 of vidicon tube 80 is connected to differentiator circuit 33. Curve c of FIG. 8 shows the output of the vidicon tube 80. It will also be seen that the output of the vidicon tube 80 corresponds to curve eA of FIG. 6B. In theory, the output of vidicon tube 80 can be connected directly to an average value detecting circuit such as 82 in FIG. 7A. The device will actually work well this way and it will provide extreme simplicity in circuitry. However, the output of vidicon tube 80 is first put through differentiator circuit 33 and then the output of differentiator circuit 33 shown as waveform d is connected to the input 83 of flip-flop circuit 84. Differentiator circuit 33 responds to both the positive going leading edge of the output of vidicon tube 80 and to the negative going trailing edge of the output of vidicon tube 80 as shown in curve d of FIG. 8. The differentiator circuit insures that there will be a sharp pulse indication of the beginning of the intersection 75 or 76 corresponding to leading edges 66 and 72 of beams 65 and 71. The output of differentiator circuit 33 is connected to input 83 of bistable multivibrator 84 so that bistable multivibrator 84 is triggered into the set state by positive going pulses and into the reset state by negative going pulses, one input accepting both positive and negative pulses. Flip-flop multivibrator 84 acts as both an amplifier of the output of differentiator 33 as a peak clipper so that positive or negative pulses of a uniform magnitude are produced. There will, then, be no shift in the scale of voltage since in this apparatus the average value of the voltage output of flip flop 84 corresponds to the distance or altitude to be measured. The output of multivibrator 84 is shown as curve e in FIG. 8. The curves in FIG. 6B are shown as only positive going pulses. This is because the average value detector 82 clips off the negative portion of the waves so that there will always be present a net average value of D.C. voltage out of the flip flop 84. The output of flip flop 84 is connected to the input of average value detector 82. Average value detector 82 produces an output voltage corresponding to the average position value of the output from flip flop 84. The output of average value detector 82 is shown at terminal 85 as an error voltage. The value of this error voltage is a direct analog for the distance between the apparatus mounted in aircraft 59 and the ground 77 or from the apparatus to whatever surface it is desired to measure. Output terminal 85 is connected to an altitude indicator 86. Altitude indicator 86 may be one of several types well known in the art, such as, a D.C. voltmeter calibrated in terms of altitude in feet or a voltmeter with a digital readout, etc. To illustrate the extreme simplicity of the circuitry involved in FIG. 7A, FIG. 7B shows a detailed circuit which is one of many possible forms for the average value detector 82. As shown in FIG. 7B, input voltage e is coupled to the detector 82 by coupling capacitor 87, with resistor 88 providing the ground return for capacitor 87. Diode 89 clips off the negative portion of the output of flip flop 84 as discussed above. Resistor 90 in conjunction with capacitor 91 provide a low pass RC circuit with a relatively long time constant which responds to the average value of the input wave e. The output is at terminal 85 which is the junction of resistor 90 and capacitor 91. Increasing positive voltages indicate larger distances and zero voltage would indicate the minimum altitude which can be measured by the apparatus.

Figure 9:
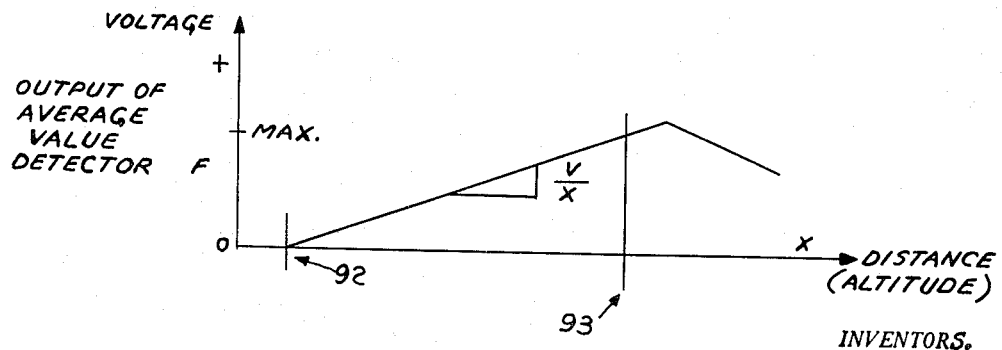
FIG. 9 is an idealized plot of the characteristics of the average value detector shown in FIGS. 7a and 7b.

It will be readily understood that the embodiments of FIGS. 6A, and 7A can be used in a closed loop control system such as shown in FIG. 5, as discussed in connection with the embodiments of FIG. 1. When the apparatus of FIG. 6A and FIG. 7A is used in a closed loop control system, the output terminal of the distance measuring apparatus would be terminal 85 instead of terminal 49. Again, the input to the apparatus in block 51 will be the reflections from the ground surface 77 as shown at 53 in FIG. 5. There is only one minor difference in operation. The embodiments of FIGS. 1, 2 and 5 inherently servo about a particular zero signal altitude such as $h_2$ where the two beams intersect. The embodiment of FIG. 6A has no such inherent reference altitude, but for any particular altitude, FIG. 6A readily provides a distinctive voltage corresponding to that altitude. It is only necessary when using the embodiments of FIGS. 6A and 7A in a closed loop servo mechanism system such as described in FIG. 5 to set the wiper of potentiometer 56, for example, to the voltage corresponding to the altitude which it is desired to maintain. Then, the apparatus of FIGS. 6A and 7A will produce this same voltage at the correct altitude. The difference taker 54 will subtract the two equal voltages, one from output terminal 85 of the altimeter and the other from the wiper 55 of potentiometer 56. The error voltage shown as E in FIG. 5 will be zero when the aircraft is at the correct altitude. It can be readily seen that by adjustment of potentiometer 56 the equipment of FIGS. 6A and 7A may be made to keep the aircraft at any desired altitude within the range of the instrument. The circuitry described in FIG. 7A may be implemented by many techniques well known in the art and may be constructed using transistors, vacuum tubes or magnetic cores or other active elements. It will be appreciated that the embodiment of FIG. 7A can be built using less than ten transistors, for example, so that the present device provides extremely simple electronic circuitry for accomplishing the measurement of distance. FIG. 9 shows the response characteristics required of the average value detector 82. The abscissa is plotted as the distance or altitude scale, and the output voltage of average value detector 82 is the ordinate. The output curve starts at point 92 corresponding to the lowest altitude, which can be of convenient value according to the adjustments of the parameters described in FIG. 6A. An altitude is shown at point 93 in FIG. 9 corresponding to the largest altitude that can be measured.

It is desirable to confine the range of the apparatus to the linear range of the average value detector 82. Other types of average value detector may be readily substituted in place of the circuitry shown in FIG. 7B. It will be noted that the response curve of FIG. 9 has a particular slope $$\frac{V}{X}$$

In other words, for a given change in altitude there will be a corresponding change in the voltage output of average value detector 82. This slope may be readily varied in two ways. If the beam width angles F and R, shown in FIG. 6A, are made larger the slope of FIG. 9 will become steeper so that for a given change in altitude there will be a larger corresponding change in the output voltage of the average value detector 82 and vice versa. The second technique to alter the slope of the response curve of FIG. 9 is by means of the angles B and C of FIG. 6A. Thus, if the separation between the intersections 75 and 76 is made larger by increasing angles B and C in FIG. 6A, the average value detector 82 of FIG. 7A will produce a somewhat smaller voltage because the charge will leak off of capacitor 91 in between successive scanning cycles so that for any particular altitude corresponding voltage output, as shown in FIG. 9, will be less for a wider separation. Thus, for any particular altitude, the average value detector 82 will produce a smaller value of output voltage, for larger values of beam angles B and C. By making beam width angles F and R different or by making beam orientation angles B and C different from each other, it is obvious that any particular desired slope of altitude versus voltage can be obtained. Also, in certain applications, such as control of machine tools, for example, it may be desirable to use relatively large angles for F and R to produce appreciable changes in voltage for relatively small changes in distance between the apparatus and the surface. It is also to be noted it makes no difference if the aircraft 59 or support means is moving with respect to the surface 77 because, as far as the device is concerned, one portion of ground is equivalent to the next portion. The beams 65 and 71 form virtual targets 75 and 76 upon the ground plane 77, and these virtual targets move right along with the apparatus in aircraft 59 as the aircraft travels transverse to the ground. Also, momentary differences in the coefficients of reflectivity of the ground plane 77 or the surface to be measured will make no difference to the apparatus because the differentiator circuit 33 and multivibrator circuit 84 produce uniform outputs even when the intensity of illumination on the surface of vidicon tube 80 varies.

Figure 10:
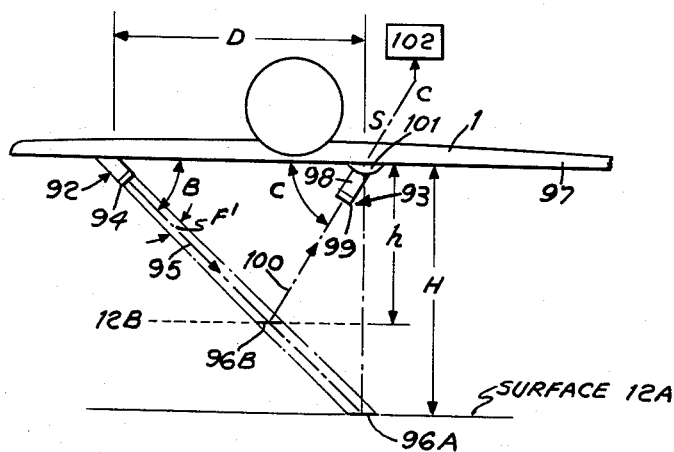
FIG. 10 is a diagram illustrating a third embodiment of the invention.

FIG. 10 shows an additional embodiment of the invention which involves the use of one projector 92 and one movable scanner 93. Projector 92 includes a source of electromagnetic radiation and a lens system 94. The wavelength for the radiation emitted may be any convenient value within the visible, infrared or ultraviolet region. It is desirable to arrange the lens system 94 so that projector 92 produces a relatively narrow beam of radiation 95 which has a relatively narrow beam width angle F', as shown, although the value of F' is not critical. But operation will be facilitated if the intersection of the beam 95 will surface 12B as shown at 96A is not too broad. Projector 92 is mounted on the underside 97 of support 1 and projector 92 has a fixed orientation with respect to the movable scanner 93. The axis of beam 95 makes an angle B from the horizontal as shown. Angle B may be any convenient predetermined angle but once fixed, the angle B does not change. The scanner 93 includes a receiver 98 responsive to radiation reflected from the intersection of beam 95 and surface 12 at 96A as shown. Scanner 93 further includes a lens system 99 which focuses reflected radiation from spot 96 upon receiver 98. The scanner 93 is different from any of the scanners which have been discussed in the previous embodiments in that it is movable. Scanner 93 is so constructed that it has free rotational movement in one plane. Thus, the scanner 93 can look or point towards any spot within 180 degrees of rotation underneath the support 1.

The axis of the line of vision of the scanner 93 is shown as 100. The axis 100 of scanner 93 makes a variable angle C from the horizontal. Measurement of the angle C actually provides the date for measurement of the distance $h$ of the support or object from the surface 12A. If the scanner 93 were pointing straight down, that is, angle C had a value of 90 degrees, the scanner would look directly at target spot 96A created by the intersection of beam 95 from projector 92 and the surface 12A. When scanner 93 is pointing straight down vertically, the distance between the underside 97 of the support 1 and surface 12A is the reference distance H. Suppose now that the support 1 moves closer to the surface 12A at a smaller distance such as $h$. The surface 12A assumes position 12B. It will be seen the angle of the axis 100 of scanner 93 assumes the angle C which is less than 90 degrees so that scanner 93 may focus on the new intersection of beam 95 with the ground 12B at spot 96B. It can be seen that since the angle B of beam 95 is fixed and since projector 92 and scanner 93 are separated by a fixed known distance D, then the angle C of the axis 100 of scanner 93 is directly related to the altitude $h$ and depending upon the reference altitude H, the measurement of angle C at any instant provide a measure of the instantaneous altitude $h$. The operation of the embodiment of FIG. 10 is as follows. When the apparatus is first set up, when the scanner angle C is 90 degrees, a convenient reference distance H is fixed so that scanner 93 points straight at the intersection 96A of the beam 95 with the surface 12A. Then, at any distance which is different than the distance H, such as $h$, the scanner will always follow the target spot such as 96B, so that as the distance varies, the angle C of the scanner 93 will vary also as it follows the intersection spot as the spot moves along the line defined by the fixed beam 95. Scanner 93 may be the type of servo mechanism driven scanner which automatically focuses on and follows the point of brightest illumination in its field of vision and measurement of the rotation of the shaft 101 of scanner 93 provides the measure of the distance $h$. The rotation of shaft 101 is transmitted to utilization means 102 which provides a suitable indication of distance $h$, or otherwise uses the measurement.

Figure 11:
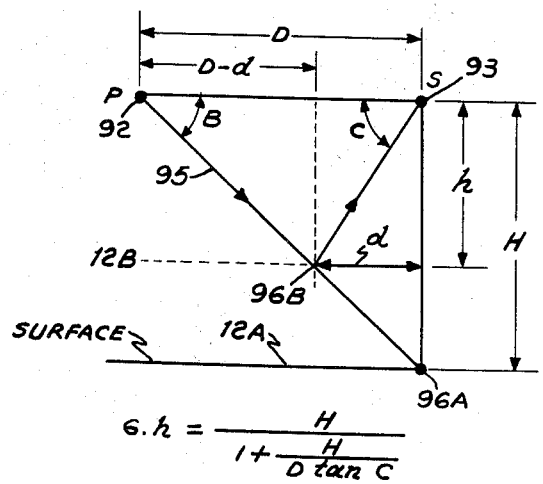
FIG. 11 is a trigonometric diagram useful in describing the operation of the embodiment of FIG. 10.

FIG. 11 shows FIG. 10 redrawn and simplified so that the derivation of the function of angle C versus altitude may be described with greater clarity. In FIG. 11, projector 92 is indicated simply as a dot. The scanner 93 is likewise indicated as another dot separated from projector 92 by distance D. The altitude H at which the scanner angle C is 90 degrees is shown as the reference distance, and the beam 95 from projector 92 is shown at an angle B from the horizontal and the instantaneous angle of the scanner C is shown for a position of the surface at 12B with the target spot at point 96B along the line of beam 95. For the purposes of derivation, the lateral distance from, the vertical line between the scanner 93 and the reference intersection point with the ground 96B is shown as the distance $d$. Likewise, the remaining part of the distance from the instantaneous intersection point 96B measured laterally to the projector 92 is shown as the quantity $D-d$, since the maximum possible separation between a vertical line passing thru scanner 93 and a vertical line passing thru projector 92 is the distance D as shown. The instantaneous altitude $h$ corresponds to the height of the reference surface 97 from the ground at level 12B. With these quantities defined, the following derivation can be performed. For convenience, the quantities which are known and those which are unknown are listed:

Angle B is known, and fixed
Distance H is known and fixed
Distance D is known, and fixed
Angle C is known (measured) and variable
Distance $h$ is the desired unknown It is to be noted that angle C is not an unknown quantity, but it is actually measured by the utilization apparatus 102 shown connected to the shaft 101 of the scanner 93 as given in FIG. 10. Referring to FIG. 11, we can write from similar triangles (1) $$\frac{h}{H}=\frac{D-d}{D}$$

By rearranging (2) $$h=\frac{H}{D}(D-d)$$

By inspection (3) $$\frac{h}{d}=\tan \angle C$$

rearranging (4) $$d=\frac{h}{\tan \angle C}$$

substituting into Equation 2 the value of $d$ as given in

Equation 4 we have (5) $$h = \frac{H}{D} \times \left(D - \frac{h}{\tan \angle C}\right)$$

rearranging (6) $$h = \frac{H}{1 + \frac{H}{D \cdot \tan \angle C}}$$

Equation 6 clearly shows that for any particular value of the altitude $h$, there is a unique value of the angle C of the scanner depending on how the original trigonometry was set up. Since the value of the reference distance H is fixed and known, and the separation D between projector 92 and scanner 93 is fixed and known, Equation 6 provides a method of calibrating the rotation of the shaft 101 of the scanner 93 so that distance may be indicated directly corresponding to divisions marked on a scale according to Equation 6. By simple computation $h$, the altitude in feet can be calculated corresponding to the angle C in degrees. It will be noted that when angle C has the value 90 degrees, the tangent has the value infinity so that the fraction $$\frac{H}{D \cdot \tan C}$$

approaches zero. Hence, the distance $h$ is equal to H. This is the basis on which the trigonometry of FIGS. 10 and 11 was set up to begin with. It should be noted that altitudes larger than H may be measured by the apparatus shown in FIG. 10 with no changes. It may be necessary to derive another equation for the calibration of the shaft for rotation of angle C beyond 90 degrees. The principle of operation is the same and it will not be necessary to make any changes in the apparatus to measure altitudes or distances greater than H. It should also be pointed out that it is not necessary for projector 92 and scanner 93 to be located at the same horizontal level. Nor is it necessary for this projector 92 and the scanner 93 to lie in the same vertical plane, because orientation of scanner 93 can be changed so that scanner 93 will still always be able to observe the target spot 96 and still only have to move in one direction of rotation. All that is necessary is that the separation D between projector and scanner be known and that the initial values of the angles B and C, at the reference altitude H be known.

Figure 14:
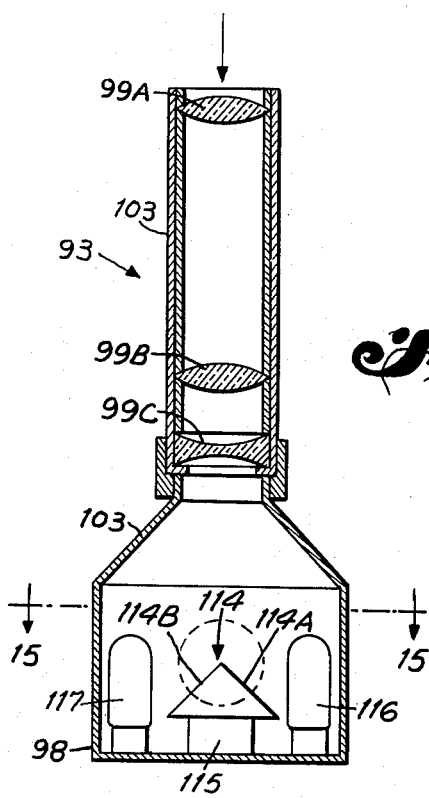
FIG. 14 is a cross-sectional, side elevational view of the scanner shown in FIGS. 12 and 13.
Figure 15:
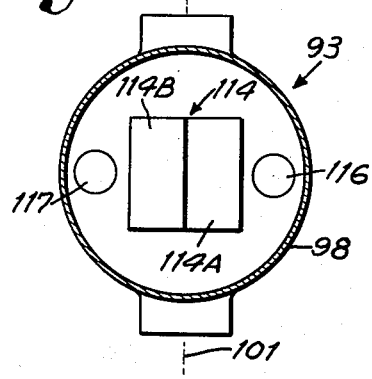
FIG. 15 is a cross-sectional view of FIG. 14 taken along the lines 15—15.

FIG. 12 shows a block diagram of a system that works in accordance with FIGS. 10 and 11. FIG. 13 shows in some detail the form of construction that might be used for the scanner 93. In FIG. 13 there is shown a lens system consisting of lenses 99A, 99B, and 99C mounted in the supporting frame 103 of the scanner. The main body 103 of the scanner is so mounted on an axis 101 that the scanner 93 is free to rotate thereabout as shown. Coupled to scanner 93 is servo motor 104 which provides power for rotating the scanner 93 about the axis 101. Also coupled to the scanner 101 are rotation transducers such as a synchro transmitter indicated at 105. Leads 106 from the synchro 105 are brought out through the supporting strut 107. The scanner 93 and the servo motor 104 are also supported by struts 108 and 109 as shown. The electrical output leads of the receiver 98 are brought out through strut 108 and are shown as leads 110 and 111. The power and control leads for servo motor 104 are brought out through strut 109 as indicated at 112. The necessary associated electronic equipment is shown in the box labeled "servo controls" 113 and provides for completion of a closed loop servo system that will enable the scanner 93 to continuously focus upon the target spot 96. FIG. 14 is a more detailed side elevational view through the scanner of FIG. 13. FIG. 14 shows a lens system consisting of various lenses such as 99A, 99B, and 99C which focus the incoming radiation emitted from the intersection of the beam 95 and the surface 12 on to a two-sided prism 114. The prism has a support 115. FIG. 15 is a top cross sectional view taken along the lines 15—15 of FIG. 14 and both figures will be discussed in conjunction. FIGS. 14 and 15 show two photocells 116 and 117, one located facing each of the two sides of the prism 114. The axis 101 about which the scanner rotates is shown in FIG. 15. The principle of operation of the scanner is this. The incoming beam of light which emanates from target spot 96, enters scanner 93, strikes the prism 114 and part of the light is reflected from the prism face 114A and into the photoelectric tube 116. A portion of the incoming beam of radiation which strikes the other face 114B of the prism 114 enters the phototube 117. If the incoming beam of radiation is exactly centered so that one-half of the radiation strikes the face of prism 114A and the other half of the radiation exactly strikes face 114B of the prism 114, then the excitation produced within each phototube 116 and 117 is exactly equal and the resulting output voltage from the two phototubes 116 and 117 is exactly equal. However, if the incoming beam of radiation moves off center, that is, the scanner 93 becomes slightly misaligned with the center of the target of radiation 96 then the prism 114 will reflect more energy off one of its faces 114A for example. Then the output from the phototube 116 will be greater than the output at that time from the other phototube 117. This difference between the outputs of the two phototubes will provide an error signal that has both sense and direction to drive the associated servo motor 104 and amplifiers in 113 (not shown) to move the scanner 93 to realign it with the center of the beam so that radiation is again equally split by the two faced prism 114.

Figure 16:
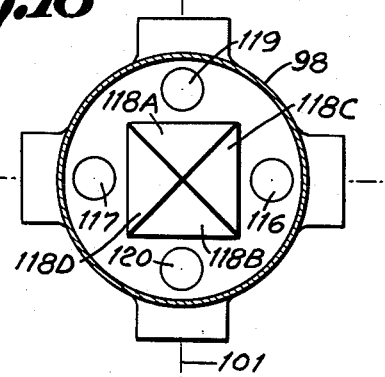
FIG. 16 shows an alternative arrangement of parts of the scanner shown in FIGS. 12, 13 and 14.

FIG. 16 shows an alternate construction for the scanners of FIGS. 13, 14, and 15. In FIG. 16 a four-sided prism 118 is shown with four faces, 118A, 118B, 118C, and 118D. Four phototubes are shown 116, 117, 119, 120. FIG. 16 allows the scanner to scan around two axes of rotation. Faces 118C and 118D in conjunction with phototubes 116 and 117 develop an error signal to produce rotation about one axis similar to FIG. 15. In addition, faces of the prism 118A and 118B in conjunction with phototubes 119 and 120 produce a second error signal to allow scanning motion in a second plane of rotation of the scanner. The scanner if provided with a set of two axis gimbals and a second servo motor, would be able to scan along two directions of motion. This might be desirable for certain physical arrangements of FIG. 10. FIG. 12 utilizes the scanner shown in FIGS. 13, 14 and 15 using two photocells and shows a beam of radiation 95 emitted from projector 92 intersecting the ground in area 96 on which the scanner 93 focuses. Within the receiver 98 of the scanner 93 are shown the phototubes 116 and 117, such as illustrated in FIGS. 14 and 15. The output of one phototube 116 is coupled to a first amplifier 121. The output of the second phototube 117 is connected to a second amplifier 122. The output of amplifier 121 is coupled to one of the two inputs of the difference amplifier 123. The output of amplifier 122 is coupled to the other input 125 of the difference amplifier 123. The output 126 of the difference amplifier 123 is coupled to the control leads 112 of the servo motor 104. Thus, if the output from phototube 116 is larger than the output from phototube 117, the difference amplifier 123 will produce a signal to cause the servo motor 104 to drive the scanner 93 in the downward direction so as to equalize the radiation falling upon phototubes 116 and 117. Likewise, if the radiation on phototube 117 is larger than the amount of radiation falling on phototube 116, the difference amplifier 123 will produce an output of opposite polarity to that mentioned before to cause servo motor 104 to rotate the scanner 93 in the upward direction to equalize the radiation falling on phototubes 116 and 117. Thus, a complete closed loop servo mechanism is provided for continuously causing the scanner 93 to follow, or servo, on to the position of the spot 96 on the surface 12. The rotation of the output axis 101 of the scanner 93 is coupled mechanically to a transmitting rotation transducer 127. This could be a synchro transmitter such as 105. Then, by means of the leads 106A, signals corresponding to the shaft position of shaft 101 and the angular position C of axis 101 are transmitted to a receiving rotation transducer 128, which can be a synchro repeater. The shaft of the receiving rotation transducer 128 could be connected to a pointer which moves over a scale calibrated in accordance with Equation 6 as derived above in FIG. 11. Thus, angle C is measured by the transmitting and receiving rotation transducers 127 and 128 and the distance will be indicated by a pointer moving over a scale such as shown by the distance indicator 129. The leads 106A would be the three stator leads if a synchrotype data transmission system is used. Also, at terminals 106A an error voltage will be produced that can be used to provide a closed loop servo mechanism in the same manner of FIG. 5. A potentiometer can be used for the reference input as described above or a synchro transmitter coupled to a shaft and a knob for the manual setting of the desired altitude at which the system should servo. It can be noted that the outputs of the phototubes 116 and 117 could be connected directly to the inputs 124 and 125 of the difference amplifier 123. To provide more gain and a faster response in the scanner servo loop, it may be desirable to provide amplification. It will be readily appreciated that the apparatus described in FIGS. 10, 11, and 12, 13, 14, 15, and 16 can be readily used to measure or control the distances other than altitude and can be readily used in machine tool control and other applications. The scanner of FIGS. 13, 14, 15, and 16 might take other forms, but the principle of operation of the embodiment of FIG. 10 remain the same.

Figure 18B:
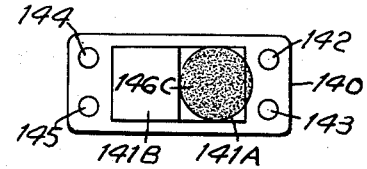
Figure 18C:
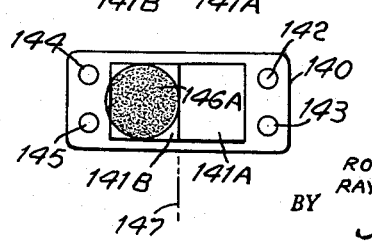

FIG. 17 shows still another embodiment of the present invention. This involves the use of one projector and one fixed scanner which does not move physically. There is shown a scanner 130 and a projector 131 mounted upon a support 132. The distance to be measured is indicated as the distance between the underside 133 of the support 132 and the surface 134 to which distance is to be measured. Projector 131 includes a source of electromagnetic radiation 135 and a lens system 136 for directing the radiation from the source 135. The source 135 and lens system 136 produce a beam of radiation 137 which has a predetermined angle of beam width shown as the angle F. The axis of the beam in the projector 138 is set at an angle B from the horizontal as shown. Projector 131 and scanner 130 are separated from each other by the distance D. FIGS. 18A, 18B, and 18C help to show both the construction of scanner 130 and the operation of the embodiment of FIG. 17. The scanner 130 has some similarities of construction in common with the scanner shown in FIGS. 13, 14, 15 and 16 but it has many novel features in addition. Scanner 130 includes a lens system indicated by lenses 139A, 139B, and 139C. FIGS. 18A, 18B, and 18C are three variations of a cross-sectional view looking up in to the scanner 130 along lines 18—18 in FIG. 17. The lens system 139 is supported by the body of the scanner 140. Within the scanner body 140 is a prism 141 with two sides, 141A and 141B. Prism 141 is shown in FIG. 17 and FIG. 18. Four phototubes 142, 143, 144, and 145 are mounted in the scanner. Two phototubes 142 and 143 are mounted adjacent to each other on one side of the prism 141. Phototubes 144 and 145 are mounted adjacent each other on the other side of the prism so that radiation which strikes face 141A of the prism 141 will enter into phototubes 142 and 143, whereas radiation which strikes 141B of prism 141 will enter and excite phototubes 144 and 145. The field of vision of the scanner 130 has an angle of vision denoted as angle M in FIG. 17. The outputs of phototubes 142 and 143 are connected in series to provide the device with more gain. Likewise, the outputs of phototubes 144 and 145 are also connected in series to provide more gain. More or less phototubes can be used on each side of the prism 141 to provide more gain and/or a broader field of vision for the scanner. The beam 137 from projector 131 is shown intersecting the surface 134A in intersection 146A. This corresponds to the point of maximum distance, $h$ max., between surface 134 and reference plane 133 of support 132. Intersection 146B shows the intersection of surface 134 when the distance to the surface is $h_0$. Intersection 146C shows the intersection of the beam 137 with surface 134 when the separation is the minimum distance, $h$ min., as shown. In FIG. 17, it will be noted that the axis 138 of the beam 137 intersects and crosses the center line 147 of the field of vision of the scanner 130. The dividing edge between the two faces of the prism 141 in exactly aligned with this center line 147 of the field of vision of the scanner 130. At the distance $h_0$, the field of vision of the scanner is illustrated by FIG. 18A. It will be seen that the target spot 146B is so arranged with respect to the scanner 130 that target spot 146B is equally distributed on the two faces 141B and 141A of the prism 141 so that a diameter through the target spot 146B is exactly aligned with the center line 147 of the scanner and the dividing edge of the prism 141. Thus, both sides A and B of the prism 141 receive exactly equal amounts of radiation from the beam 137 as reflected by the intersection 146B with the surface 134B. Since both sides of the prism are equally illuminated by the radiation from beam 137, photocells 142 and 143 together receive exactly the same amount of energy radiation as photocells 144 and 145 together receive. Hence, the outputs from the phototubes 142 and 143 is equal to the output from phototubes 144 and 145. Suppose, however, that the distance between the surface 134A and the apparatus 133 is given by the distance $h$ min. which represents the minimum distance that can be measured by the apparatus. FIG. 18B shows the situation at the distance $h$ min. The target spot 146C now falls entirely upon the face 141A of the prism 141. There is no illumination at all of the 141B side of the prism 141. Hence, all the radiation passes into phototubes 142 and 143, and the output of phototubes 142 and 143 will be much greater than the output from phototubes 144 and 145 which are unexcited since they received no radiation from the target spot 146C. It can be seen that for distances intermediate $h$ min. and $h_0$, a larger percentage of the area of the target spot 146 falls onto the side of the prism 141A. The phototubes 142 and 143 will receive more energy and hence have a greater output voltage for any distances between $h$ min. and $h_0$. But as the distance gets greater and approaches $h_0$, the outputs from the phototubes 142 and 143 will begin to decrease relatively and approach the output from the phototubes 144 and 145. At that height $h_0$ the target spot 146B will be equally divided between the two sides of the apparatus. The height $h_0$ is picked at a predetermined convenient distance, and by varying the angle B of the projector 131, the angle of the beam width F and the separation D between the projector 131 and the scanner 130 any convenient range of distances may be measured. The distance $h$ max., represents the largest distance that can be measured by the apparatus. It will be seen that the target spot of reflected energy 146A now falls entirely upon the 141B side of the prism 141, as shown in FIG. 18C. There is no radiation falling upon the 141B side of the prism. Hence, the output from phototubes 144 and 145 will be much greater than the output from phototubes 142 and 143 and for heights intermediate $h$ max. and $h_0$, the output from phototubes 144 and 145 will still be greater than the outputs from phototubes 142 and 143. But as the distance decreases towards $h_0$ from $h$ max. the output from phototubes 142 and 143 will gradually increase and the output from phototubes 144 and 145 will gradually decrease so that again at height $h_0$ the outputs from the two sets of phototubes will be equal. Utilization means 148 measures the difference between the outputs of phototubes 142 and 143. The magnitude of the difference between the outputs of the two sets of phototubes is directly related to the distance $h$. For distances between $h$ min. and $h_0$, outputs from phototubes 142 and 143 will be larger and for distances between $h_0$ and $h$ max., the outputs from phototubes 144 and 145 will be larger. Thus, the phototubes provide an output that has both sense and magnitude to indicate the distance $h$. The utilization means 148 converts this voltage output from the phototubes into an indication of the distance or into an error voltage for use in control mechanisms. Actually, the apparatus of FIGS. 17 and 18 may be used for distances less than $h$ min. and larger than $h$ max. However, operation may not be as reliable because for distances less than $h$ min., the target spot 146C will begin to move off entirely of the face 141A of the prism to the right. Likewise, for distances greater than $h$ max., the target spot 146A will begin to move off the face 141B of the prism 141, so that eventually if the distance $h$ is larger than $h$ max., the output from phototubes 144 and 145 will actually begin to decrease again although the output from them will still remain larger than the output from phototubes 142 and 143 so that there is no ambiguity involved. Simpler instrumentation is obtained by limiting the ranges as shown. It will be noted that the diameter of the target spot 146 is not shown as being constant in FIGS. 18A, 18B, and 18C. This is because to the scanner the size of the target spot appears to be varying because the beam width angle F of the projector 131 actually causes a larger area of the surface 134A to be covered by the beam 137 at larger distances. The increase of distance from scanner to the surface will cause an opposite effect in that the size of the image will decrease with increased distance. If the two effects do not cancel there will be a change in the apparent size of the target spot as seen by the scanner. This change is shown in FIGS. 17 and 18. This difference in size of the target spot 146 makes no difference to the operation of the apparatus in this embodiment because it is the difference in illumination between two sets of phototubes on each side of the prism that is important and not the absolute magnitude of the illumination itself.

FIG. 19 shows an electronic instrumentation of the embodiments of the invention shown in FIGS. 17 and 18 and shows projector 131 emitting beam of radiation 137 which strikes a surface 134 to which the distance is to be measured. The intersection of the beam 137 and the surface 134 indicated as 146 emits reflected radiation which is viewed by the scanner 130. The outputs of phototubes 142 and 143 are shown connected to a first adder circuit 149. The adder circuit 149 adds the outputs of phototubes 142 and 143 so that the output 150 of the adder 149 is the sum of the two input voltages. The output of adder 149 is put into one input 150 of a difference amplifier shown as 151. The outputs of phototubes 144 and 145 are introduced into the inputs of adder 152. The output 153 of adder 152 is the sum of the outputs of the phototubes 144 and 145. The output 153 of adder 152 is put into the other input 153 of difference amplifier 151. The difference amplifier output 154 is the difference between the inputs 150 and 153 to the difference amplifier 151. Hence, the output voltage 154 represents the difference in amount of illumination of the two sides of the prism 141 as explained in connection with FIGS. 17 and 18. This voltage 154 is a direct analog of the distance $h$ between the apparatus mounted on support 132 and the surface 134. The output 154 of difference amplifier 151 is put into the input of a distance indicator 155, which provides for visual or other display of the distance to an operator. Alternately, or at the same time, the voltage output 154 representing the distance $h$ may be used as an error voltage in a closed loop servo mechanism control system such as discussed under FIG. 5 and in connection with FIGS. 1 and 2 above. Thus, the distance $h$ between the apparatus and the surface 134 varies. Target spot 146 created by beam 137 from projector 131 will appear to move transversely across the field of vision of the scanner 130. The prism 141 and the phototubes 142, 143, and 144, 145 provide for means to detect the amount of this transverse motion of the target spot 146 across the field of vision of the scanner 130. This transverse motion of the target spot is then translated into measurement of the changes in distance $h$. The apparatus shown in FIG. 19 may be built using tubes, transistors or magnetic cores, etc., and techniques for building all of the circuits shown in FIG. 19 are well known in the art.

FIG. 20 shows a fifth embodiment of this invention. A projector 156 and a stationary scanner 157 are mounted on support 158, separated from surface 159, the distance to which is to be measured. Projector 156 includes a source of radiation 160 and a lens system 161. For the operation of this embodiment it is necessary that the lens system 161 produce a nearly parallel beam of radiation 162 and the edges 163 and 164 of the beam 162 should be substantially parallel to each other along the entire length of the beam. Again the source 160 can emit radiation at any convenient wave length within the visible, ultraviolet, or infrared spectrum. Parallel beam 162 intersects the surface 159 in area 165. It is to be noted that the area covered by the intersection 165 is independent of the distance $h$ from the apparatus to the surface 159. This embodiment of the invention uses the well-known effect that objects appear to become larger as we approach closer to them. The human eye, for example, receives the impression that the farther away an object is, the smaller the object appears to be. The present invention provides a reference target of fixed size and electronically provides a method of determining the apparent size of this projected reference target. The scanner 157 includes a receiver 166 and a lense system 167. The lens system 167 focuses the reflected radiation from the intersection 165 of the beam 162 and the surface 159, upon the face 168 of the receiver 166. Thus, an optical image 169 of the intersection area 165 is formed upon the face 168 of the receiver 166. From elementary principles of optics, the closer surface 159 is to the face of 168 of receiver 166, the larger the image 169 will appear to be. The image 169 lies in the focal plane of the lens system 167 so that if the distance is as shown by the surface at level 159A, the intersection 165A will appear as a certain size spot, or target, 169 upon the face 168 of the receiver 166.

FIG. 21A will assist in the explanation of the phenomena. Thus, in FIG. 21A, a circle or image labeled 169A corresponds to altitude $h_1$ and the target 165A appears to be relatively large. As the distance is increased to a distance $h_2$ for example, and the ground level is 159B, target spot 165B appears as the image 169B shown in FIG. 21A and it is of a smaller size in area. Likewise, for ground level 159C corresponding to distance $h_3$ target spot 165C is again smaller in size and area and the image 169C is smaller. For a fourth level at ground level 159D, the image upon the face 168 is shown in FIG. 21A as the image 169D which is the smallest in size and area. It will be noted that the images 169A, 169B, 169C, 169D in FIG. 21A successively appear to move from the right face of surface 168 towards the left face. This effect is of no consequence because it is the size and area which are important and the actual location of the image 169 upon the area of surface 168 of the receiver makes no difference. FIG. 20 shows that the projector 156 is inclined at an angle B from the horizontal and hence the beam 162 intersects the field of vision of the scanner 157 at an angle, hence the images formed upon the face of the scanner 168 appear to move transversally for different distances $h$, but as has been pointed out this is of no importance. For any given size of image there is one predetermined distance $h$, determined by the geometric and trigonometric relationships which have been set up as shown in FIG. 20.

FIG. 22 shows a block diagram of the instrumentation used in connection with the embodiment of FIG. 20. In FIG. 22 projector 156 producing beam 162 by use of lens system 161 is shown. The reflection from the intersection 165 of the beam 162 with surface 159 is shown entering the lens 167 of the scanner 157. The receiver 166 of the scanner 157 is shown in FIG. 22 as a vidicon tube. An image orthicon tube could equally well be used as pointed out before. The front surface 168 of vidicon tube 166 is located in the focal plane of the lens system 167 so that the image 169 of the target spot 165 is focused upon the face 168 of the vidicon tube 166. One of the two sweep terminals of vidicon tube 166 is shown as terminal 26 and the output terminal of the vidicon tube 166 is shown as terminal 28. As before, the vidicon tube is swept in only one axis, that is, either the horizontal or the vertical, but only one direction of sweep is necessary. Direction of sweep is along the line labeled X—X in FIG. 21A, and the sweep may either be from the left to the right, or the right to the left, and will make no difference in this embodiment of the invention. As shown in FIG. 21A, the scanner will actually sense the size of the images 169A, 169B, 169C, etc. by measuring the diameters along the direction of sweep. There is no point in scanning the images in FIG. 21A in two directions because all the information upon their size can be obtained by one sweep through a diameter. It should be remembered that any one time there is actually only one image, such as 169A or 169B etc., as shown in FIG. 21A, there will never be more than one image upon the face of the vidicon tube 166 at any one time. The four images shown in FIG. 21A are for the purposes of illustration only and are consecutive, not simultaneous images. It is to be noted that the embodiment illustrated in FIG. 22 in conjunction with FIG. 20 uses both the brightness and the apparent size of the images formed upon the face of the scanner 157 as will be explained below.

An astable multivibrator 30 provides the basic timing wave forms for the system. Any convenient repetition rate may be used; for example, one kilocycle per second. Faster scanning rates in general giving a faster response in a shorter time for the system. The output wave form "a" for the astable multivibrator shown in FIG. 22, is the same as shown in FIG. 8 wave form "a." The output of the astable multivibrator 30 is connected to the input of a sweep generator 31. The output of the sweep generator 31 is connected to one of the sweep terminals 26 of the vidicon tube 166. Sweep output b of FIG. 22 is as shown in FIG. 8 curve b. The electron beam within the vidicon tube scans the surface 168 of the tube and when it encounters image 169 of the target spot 165 such as image 169a shown in FIG. 21A an output is produced during the time the scanning beam is on the area illuminated on the face of the tube. FIG. 21B shows the output S in FIG. 22 at terminal 28 of the vidicon tube. In FIG. 21B, the pulse A corresponds to the image 169A shown in FIG. 21A, corresponding to the smallest distance $h_1$. Likewise, the pulse B in FIG. 21C corresponds to the image 169B shown in FIG. 21A and representing the distance $h_2$.

In FIG. 21B we note that the output S of the vidicon tube 166 at terminal 28 in FIG. 22 has two distinct characteristics. The first of these is the width of the pulse along the time axis as A. Thus, the larger size image such as 169A in FIG. 21A produces the pulse with the longest width since the scanning is done at a uniform rate across the face 168 of the vidicon tube 166. Likewise, image 169B located at distance $h_2$ is smaller and hence the width of pulse B, $T_B$, is smaller, as shown in FIG. 21C. The other characteristic of the output of the vidicon tube 166 in FIG. 22 is that the amplitude of the voltage output V corresponds to the magnitude of the intensity of the illumination falling upon the vidicon tube 166. For a given projector 156 and a particular type of surface 159, the intensity of the image as measured by voltage V in the pulses shown in FIGS. 21B, C and D will remain constant. This is because the size of the image is inversely proportional to the square of the distance $h$ from the apparatus to the surface. Also the intensity per fixed area of the receiver 157 is inversely proportional to the square of the distance $h$ from the apparatus to the surface. Hence the intensity over the area of the image itself will be a constant as measured in incident energy per square unit of image area. Thus all output pulses from vidicon tube 166 have the same amplitude V. The other pulses are similarly related, thus the embodiment of FIG. 22 responds to the area of the pulse actually, which is the product of the time T and the amplitude of the pulse V. Thus Area=$V.T$. In FIG. 22 the output of terminal 28 of the vidicon tube 166 is sent through an amplifier 170 and the relative size of the pulse remains unaltered except that it is brought to more acceptable voltage levels for later use. The output of the amplifier 170 is introduced to the input of an average value detector 171. The average value detector 171 as its name implies actually measures the area of the pulse as shown in FIGS. 21B, 21C and 21D and hence the output at terminal 172 of the average value detector 171 is a voltage which corresponds to both the intensity of illumination and the size of the image produced in the scanner 157. The output of the average value detector at terminal 172 is introduced into a distance indicator which could provide a visual indication of the distance or a record of this distance. Also the voltage produced at terminal 172 by the average value detector 171 can be used as an error voltage for use in a closed loop servo mechanism system such as shown in FIG. 5. If used in the close loop servo mechanism system, terminal 172 will be substituted for terminal 49 shown in FIG. 5 and the input of the distance measuring apparatus will again be reflections as shown in 53 of FIG. 5.

FIG. 23 shows an alternate construction of FIG. 22 which has an astable multivibrator 30, a sweep generator 31 and a vidicon tube 166 the same as in FIG. 22. However, the outputs of vidicon tube 166 is put into a differentiator circuit 173. The differentiator circuit 173 responds to the leading and the trailing edges of the pulses such as A shown in FIG. 21B, producing a sharp spike input corresponding to the leading and trailing edges of the pulses. The output of the differentiator 173 is connected to the input of a flip-flop 174. The flip-flop 174 is flipped into the set state by a positive pulse from the differentiator 173 and placed in the reset state by a negative pulse from the differentiator 173, thus the flip-flop 174 is placed in a set state at the leading edge of a pulse in FIGS. 21B, C or D caused by leading edge 163 of beam 162 and is placed in the reset state by the trailing edge of a pulse. The trailing edge of pulse A corresponds to trailing edge 164 of beam 162. The output of the flip-flop 174 is placed into a clipper 175 and the clipper removes the negative portion of the output of the flip-flop 174. The output of the clipper 175 is introduced to the average value detector 171 and from there on the operation is similar to the operation of the embodiment of FIG. 22. The reason for the use of the differentiator 173, the flip-flop 174 and the clipper 175 can now be readily seen. Differentiator circuit 173 responds to the leading and trailing edges of the pulse outputs from the vidicon tube 166. However, the flip-flop circuit 174 will produce a uniform level of output depending on its design parameters. Whether the input from the differentiator circuit 173 is larger or smaller the flip-flop 174 only sets to one level: the one value of voltage in the set state; and to another set value of voltage in the reset state, so that any differences in amplitude of the differentiator 173 output are not reflected by the output of the flip-flop 174. Hence the circuit is only responsive to the time location of the leading and trailing edges of the pulse. The clipper 175 removes the negative portion of the wave for convenience. The average value detector 171 may only respond to the positive portion of the flip-flop output; hence, the output of flip-flop 174 will be similar to the curves shown in FIGS. 21B, 21C, and 21D. The amplitude of all the pulses will be the same although their width will vary. The width of the pulses such as $T_A$ or $T_B$ or $T_C$ will still vary as before depending upon the size of the image projected upon the face of the scanner 157.

Thus, the embodiment of FIG. 23 is not effected by the intensity of the pulse at all but merely uses the size of the image denoted by the pulse width. This may be desirable for example if the device is used as an altimeter with an aircraft. The roughness and the reflectivity of the ground over which the aircraft is moving may vary from spot to spot so that there may be different values of brightness of illumination as shown by voltage V introduced simply by the nature of the ground terrain. The embodiment of FIG. 23 only uses one of the two available dimensions, the width of the image or the width of the pulse to measure the altitude $h$. There may be other applications where it is also desirable not to utilize the brightness, such as in machine tool control where the work pieces upon which the beam of radiation is displayed vary in brightness and there may be varying background illumination due to other causes. This might cause false inputs to the distance measuring apparatus. In other respects, the embodiment of FIG. 23 will operate in the same manner as discussed as the embodiments of FIG. 22 and FIG. 20. The mechanical arrangements for FIG. 23 can be similar to the arrangement of FIG. 20.

While we have described above the principles of our invention in connection with specific apparatus; it can be clearly seen that this description is made only by way of example and not as a limitation to the scope of our invention as set forth in the objects thereof and in the accompanying claims.

We claim:

1. A system for measuring the distance to a surface comprising at least one source of electromagnetic radiation, at least one receiver responsive to said radiation reflected from said surface, means disposing said source and said receiver in predetermined geometrical relation with respect to each other and said surface, scanning means coupled to said receiver, means to secure from the output of said receiver two distinctive digital outputs representing variations in distance between said source and said surface in accordance with said geometrical relation and means responsive to said digital output securing means to compare said outputs and produce another output and means responsive to said comparison output to indicate said distance.

2. Apparatus for measuring the distance to a surface comprising a plurality of sources of electromagnetic radiation, each said source emitting a beam of electromagnetic radiation, at least one receiver responsive to radiation from said beams reflected from said surface at the intersection of said beams and said surface, means disposing said sources and said receiver in predetermined geometrical relation with respect to each other and said surface, scanning means coupled to said receiver, means to secure from the output of said receiver two distinctive digital outputs representing variations in distance between said sources and said surface in accordance with said geometrical relation, and means responsive to the outputs of said digital output securing means and said scanning means to compare said outputs and produce another output and means responsive to said comparison output to indicate said distance.

3. An altimeter comprising at least one source of electromagnetic radiation, at least one beam of electromagnetic radiation emanating from said source and directed toward the ground, at least one receiver responsive to electromagnetic radiation from said beam reflected from the ground at the intersection of said beam and the ground, means disposing said source and said receiver in predetermined geometrical relation with respect to each other and the ground, scanning means coupled to said receiver, means to secure from the output of said receiver two distinctive digital outputs representing variations in distance between said source and said ground, and means responsive to the outputs of said receiver and said scanning means to compare said outputs and produce another output and responsive to said comparison output to indicate altitude.

4. Apparatus for measuring the distance to a surface comprising first and second sources of electromagnetic radiation, said sources emitting respectively first and second beams of radiation of first and second wavelengths, a first receiver responsive to said radiation of said first wavelength, a second receiver responsive to radiation of said second wavelength, means disposing said receivers and said sources in predetermined geometrical relation with respect to said surface such that said first and second beams converge and intersect said surface and said first and second receivers respond respectively to said radiation of said first and second wavelengths reflected from said surface and produce outputs thereof, the time difference between said outputs of said first and second receivers corresponding to the separation between the intersections of said first and second beams with said surface, said time difference being proportional to the distance from said sources to said surface, and means responsive to said outputs of said receivers to indicate said distance.

5. Apparatus for controlling the distance to a surface from movable support means comprising at least one source of electromagnetic radiation, at least one receiver responsive to said radiation reflected from said surface, said source and said receiver disposed upon said support means, means disposing said source and said receiver in predetermined geometrical relation with respect to each other and said surface scanning means coupled to said receiver, means to secure from the output of said receiver two distinctive digital outputs representing variations in distance between said support means and said surface in accordance with said geometrical relation, means responsive to the outputs of said receiver and said scanning means to compare said outputs and produce another output, means responsive to said comparison output to indicate said distance, a comparator having first and second inputs, means coupling said comparison output to said first input, a variable source of reference signal, means coupling said reference signal to said second input of said comparator, motive means adapted to move said support means, means coupling the output of said comparator to said motive means, whereby the output of said comparator is used to control said distance between said support means and said surface.

6. Apparatus for measuring the distance to a surface comprising first and second sources of electromagnetic radiation, said sources emitting respectively first and second beams of radiation of first and second wavelengths, a first receiver responsive to said radiation of said first wavelength, a second receiver responsive to radiation of said second wavelength, each of said receivers having a sweep input, means disposing said receivers and said sources in predetermined geometrical relation with respect to said surface such that said first and second beams converge and intersect said surface and said first and second receivers respond respectively to said radiations of said first and second wavelengths reflected from said surface and produce outputs thereof, the time difference between said outputs of said first and second receivers corresponding to the separation between the intersections of said first and second beams with said surface, said time difference being proportional to the distance from said sources to said surface, a sweep generator, a phase detector, an astable multivibrator coupled to said sweep generator and said phase detector, the output of said sweep generator coupled to said sweep inputs of said first and second receivers, means coupling the output of said first receiver to a first differentiator circuit, means coupling the output of said first differentiator circuit to a first flip-flop, means coupling the output of said second receiver to a second differentiator circuit, means coupling the output of said second differentiator circuit to a second flip-flop, means coupling the outputs of said first and second flip-flops to a difference amplifier, means coupling the output of said difference amplifier to said phase detector, a distance indicator, a low pass filter coupling the output of said phase detector to said distance indicator whereby said time difference may be measured and translated into an indication of said distance from said sources to said surface.

7. A system for measuring the distance to surface according to claim 1 wherein said scanning means include, a sweep generator, an astable multivibrator coupled to said sweep generator, means coupling the output of said sweep generator to said sweep input of said receiver, and further comprising a differentiator, means coupling the output of said receiver to said differentiator, an average value detector, a flip-flop coupling the output of said differentiator to said average value detector, a distance indicator, and means coupling the output of said average value detector to said distance indicator.

References Cited by the Examiner
UNITED STATES PATENTS

| | | | |
|---|---|---|---|
| 2,216,716 | 10/40 | Withem | 88—1 |
| 2,297,534 | 9/42 | Brulin | 88—1 |
| 2,316,751 | 4/43 | Adler | 88—1 |
| 2,350,820 | 6/44 | Rettinger | 88—1 |
| 2,379,496 | 7/45 | Saunier | 88—1 |
| 2,443,748 | 6/48 | Sanders et al. | 244—77 |
| 2,504,981 | 4/50 | Hulburt | 88—1 |
| 2,674,915 | 4/54 | Anderson | 88—14 |
| 2,868,059 | 1/59 | Summerhayes | 88—14 |
| 3,000,256 | 9/61 | Hyde | 88—1 |

JEWELL H. PEDERSEN, *Primary Examiner.*

FREDRICK M. STRADER, *Examiner.*